United States Patent
Haley

(10) Patent No.: US 8,249,921 B2
(45) Date of Patent: Aug. 21, 2012

(54) METHOD FOR FACILITATING A TRANSACTION BETWEEN BUYERS AND SELLERS

(76) Inventor: David Alan Haley, Evansville, IN (US)

( * ) Notice: Subject to any disclaimer, the term of this patent is extended or adjusted under 35 U.S.C. 154(b) by 1503 days.

(21) Appl. No.: 11/251,039

(22) Filed: Oct. 14, 2005

(65) Prior Publication Data

US 2008/0294508 A1    Nov. 27, 2008

(51) Int. Cl.
*G06Q 30/00* (2012.01)
(52) U.S. Cl. .................................................. 705/14.1
(58) Field of Classification Search .................. 705/14, 705/40
See application file for complete search history.

(56) References Cited

U.S. PATENT DOCUMENTS

2001/0051919 A1* 12/2001 Mason ............................ 705/40
2002/0143621 A1* 10/2002 Donnelly et al. ............... 705/14
* cited by examiner

*Primary Examiner* — Saba Dagnew
(74) *Attorney, Agent, or Firm* — Botkin & Hall, LLP

(57) ABSTRACT

This invention is a method and apparatus for facilitating dual, bilateral buyer-driven and bilateral seller-driven commerce through the communication of binding conditional early payment incentive offers, acceptances, and payments. In a preferred embodiment, this invention allows buyers and sellers to communicate conditional early payment incentive offers to each other, and upon acceptance, to bind the other party to a contract. In a preferred embodiment, the apparatus includes a controller which transmits and receives conditional early payment incentive offers. Potential parties have the option to accept a conditional early payment incentive offer and thus bind the other party to a contract. The controller then facilitates payments between a buyer and a seller. The method and apparatus of the present invention have applications on the Internet as well as conventional communication systems such as voice telephony and has applications for suppliers, providers, landlords, contractors, retailers, bankers, insurance plans, governments, et al.

5 Claims, 18 Drawing Sheets

FIG. 1

One embodiment of a CEPIO method
to bind another party to a contract

Conditional Early Payment Incentive Offer (CEPIO 100) associated with
- an early payment to a seller in a specific number of business days
- an early payment incentive (% of total seller payment) to a buyer For example:
- 3% payment to buyer if seller is paid by bank deposit in 5 business days
- 2% payment to buyer if seller is paid by bank deposit in 10 business days
- 1% payment to buyer if seller is paid by bank deposit in 15 business days Seller (or buyer) inputs CEPIO 100 into computer
10

CEPIO 100 is transmitted electronically to buyer (or seller)
20

Buyer (or seller) accepts specific CEPIO 100 terms
and inputs acceptance into computer
30

CEPIO 100 acceptance is transmitted electronically to buyer (or seller)
40

Acceptance of CEPIO 100 by buyer (or seller)
binds other party to a contract
50

Seller (or buyer) performs under the contract
60

One embodiment of the CEIPO management system

One embodiment of the central controller

One embodiment of the central controller databases

One embodiment of the buyer interface

One embodiment of the seller interface

One embodiment of the process by which
a buyer formulates a CEPIO and a seller binds the CEPIO One embodiment of the process by which a CEPIO is activated and made available to potential sellers One embodiment of a procedure for maintenance of CEPIOs One embodiment of a process by which a seller binds a CEPIO One embodiment of a process by which
a buyer binds a CEPIO Cryptographic technique using symmetric keys to provide authentication and message integrity Cryptographic technique using asymmetric keys
to provide authentication and message integrity Cryptographic technique using digital signatures
to provide authentication and message integrity Cryptographic technique using message authentication codes to provide authentication and message integrity Trusted server embodiment in managing CEPIOs (Trusted server 160 and operations server 165 both work in conjunction with buyer interface 300 and seller interface 400)

METHOD FOR FACILITATING A TRANSACTION BETWEEN BUYERS AND SELLERS

FIELD OF THE INVENTION

The present invention relates generally to electronic contract applications using electronic networks. It relates to a method and apparatus for initiating and processing dual, bilateral seller-driven and bilateral buyer-driven conditional early payment incentive offers (CEPIOs), acceptances, and payments, from a buyer to a seller or from a seller to a buyer. More particularly, in a preferred embodiment, the transactions are between health care providers (sellers) and between insurance plans (buyers) for the payment of services and/or goods rendered to others. However, applications of the present invention are not limited to the fields of health care or insurance. The important effect of this invention is that it produces a new alignment of financial incentives between buyers and sellers in a manner which benefits both parties and significantly reduces the payment cycle time. The present invention is a highly effective commerce system which improves the ability of sellers to get paid faster for the services and/or goods they provide and allows buyers to make more money by paying faster that they would otherwise make by stretching out the payment cycle over time to earn "float."

BACKGROUND OF THE INVENTION

There are dozens of different buyer-seller protocols in use today. However, almost all of those systems are seller-driven in the sense that the seller sets the price for goods and services and the buyer decides whether or not to accept that price. Obviously, some forms of commerce offer far more give and take with offers and counteroffers being exchanged, however the vast majority of retail purchases utilize seller-driven, fixed-price, non-negotiable pricing protocols.

Auctions are probably the most frequently used system whereby prices are not fixed by the seller. Here too, the system is seller-driven. The buyer does not find the seller, rather the seller attracts numerous buyers who, as a group, determine the final selling price—which the seller may subsequently reject unless the item being auctioned is being sold without a reserve.

Other commerce systems are exchange-driven. These systems, such as NASDAQ of the New York Stock Exchange (NYSE) match buyers and sellers by offering an efficient fair and orderly marketplace. They favor neither buyers nor sellers, but simply effectuate communications that allow for the matching process to take place. An example of an automated exchange-driven commerce system for trading futures is disclosed in U.S. Pat. No. 4,903,201.

A buyer-driven system is one in which buyers find sellers, such as a "wanted to buy" classified ad. A help wanted ad is a buyer-driven inquiry since the employer is looking to locate and buy the services of a qualified employee. The inquiry is advertised to a large number of potential "sellers", a number of which may respond by submitting their resumes to the prospective employer.

Bilateral buyer-driven systems seek to consummate contracts between buyers and sellers based on mutual promises to perform. Bilateral buyer-driven systems, however, currently represent an extremely small portion of overall commerce. Likewise, bilateral seller-driven systems seek to consummate contracts between sellers and buyers based on mutual promises to perform. As with bilateral buyer-driven systems, bilateral seller-driven systems also represent a small portion of overall commerce.

Accordingly, there is a need for a dual, bilateral buyer-driven and seller-driven system that will allow both parties to initiate and communicate conditional early payment incentive offers, acceptances, and payments. The advantages of such a system are many. Since this technology is electronically based, costs are kept to a minimum. It is also the only way buyers and sellers can efficiently reach each other and conduct binding transactions in a manner which aligns the incentives of both the seller and the buyer and makes transactions mutually beneficial. For instance, the incentives of sellers and buyers are generally in opposition. Sellers want to get the highest price and terms for their goods and services and buyers want to get the lowest price and terms for goods and services. With a dual, bilateral buyer-driven and seller-driven system, it is possible to align the incentives of the buyer with the incentives of the seller.

As a practical example, in the health care industry, health insurance companies and governmental health insurance programs are payers (buyers) of health care services and/or goods. Insurance companies and governmental insurance programs (collectively referred to as health insurance plans) wish to extend the time between the receipt of a health care claim and the payment of the claim. Stretching this time period allows health insurance plans to maximize their use of cash flow during the time it takes to pay a claim. Further, health insurance plans also earn money through "float" during this period of time. In the prior art, paying health care claims slowly is advantageous to health insurance plans.

The prior art has an equally opposite and disadvantageous effect on providers (sellers) of health care services and/or goods. The financial incentive for providers is to minimize the time between submission of a health care claim and the receipt of payment. Health care providers do not have use of cash flow during this time and they have no ability to make money on "float" until after they receive payment. In fact, health care providers may incur significant front-end expenses in order to provide health care services and/or goods. In many cases capital expenses are financed, such as are in the construction or remodeling of a hospital, or in the acquisition of expensive equipment, drugs, and supplies. A delay in health care claim payments may result in an increase to a provider's need for more expensive short-term financing. The practice of delaying payments to health care providers has the end result of an increase in provider accounts receivables and a lowering of their cash flow.

Under the present health care payment system prevalent in the United States, financial incentives for payers (buyers) is opposite of the financial incentives for providers (sellers). Therefore, the prior art is a classic win-lose business transaction commerce system. In a time of tightened managed health care constraints and more restricted provider reimbursement from the government and insurance companies, the practice of paying as slow as will be tolerated has become unbearable to many health care providers. Laws have been enacted and many lawsuits have been filed against payers to allow providers relief from these win-lose practices. With this approach to health care economics, one party of a transaction always loses to the benefit of the other party. This system has produced an adversarial approach to the practice and commerce of medicine in this country. One can argue that the commerce system in the prior art has also contributed to the rise in health care costs, as providers have had to struggle to maintain adequate cash flow for business operations.

The present invention aligns financial incentives of providers and payers in a win-win fashion. It is a new and unique method of commerce not practiced in all of health care. The present invention lowers expenses for payers and provides payers with a new revenue stream, thus increasing payer profitably. At the same time, this invention increases health care provider cash flow and decreases their account receivables. It becomes a win-win scenario for each party to a transaction. This invention also decreases the time money is tied up in the claim payment cycle, and because of the large sum of health care dollars involved, if widely practiced, could have a positive effect on the overall economy. A positive effect on an economy is general is produced when money travels faster through the financial system, rather than slower. The faster money is available for the increased purchase of goods and services, the faster an overall economy can grow. Conversely, when money is "tight," an overall economy slows down.

A key element necessary to achieve seller and buyer participation in a dual, bilateral electronic buyer-driven and seller-driven system is the seller's ability to bind a buyer to a legal contract under the terms of the buyer's posted offer, and the buyer's ability to bind a seller to a legal contract under the terms of the seller's posted offer. This is achieved through an acceptance of the other party's offer and through authentication by a procedure agreed to by the parties.

There is no real need for a third party to administer such a dual, bilateral seller-driven and buyer-driven system that will allow both parties to initiate and communicate conditional early payment incentive offers, acceptances, and payments. However, if desired, a third party can serve as a trusted arbitrator available to resolve contract disputes between the parties and thereby increase buyer and seller confidence in the system. Additionally, the third party could establish standard protocols, formats, terms and language to be used in offers and thus make it easier for the other party to understand and assess offers. Finally, the third party could administer a site on the Internet where both parties could post and review their offers and acceptances.

The applicant is unaware of the existence of any commercially-viable dual, bilateral seller-driven and buyer-driven commerce system which contains the above features and addresses the above-described shortcomings in the prior art. Therefore, it is one object of the present invention to set forth a system of dual, bilateral seller-driven and buyer-driven electronic commerce that allows the capability for individual sellers and individual buyers to issue authenticable messages which contain the terms of a conditional early payment incentive offer (CEPIO) and publish that CEPIO to the other party.

Another object of the present invention is to allow a seller or buyer who accepts the terms of a CEPIO to bind the other party to accept fulfillment of that offer.

Another object of the present invention is to allow the seller, upon his acceptance of the buyer's terms, to receive payment from the buyer within the timeframe as set forth in the CEPIO.

Another object of the present invention is to allow the seller, upon his acceptance of the buyer's terms, to make a CEPIO payment to the buyer within the terms as set forth in the CEPIO.

Another object of the present invention is to allow the buyer, upon his acceptance of the seller's terms, to make payment to the seller within the timeframe as set forth in the CEPIO.

Yet another object of the present invention is to allow the buyer, upon his acceptance of the seller's terms, to receive his CEPIO payment from the seller within the terms set forth in the CEPIO.

It is a further object of the present invention, when desired, to allow for a trusted third party administrator whose decision regarding the fulfillment, adequacy or interpretation or any aspect of the process shall be binding on the parties.

Another object of the present invention is to provide a system in which the identity of the seller is authenticated along with the integrity of the sellers CEPIO.

A further object of the present invention is to provide a system in which the identity of the buyer is authenticated along with the integrity of the buyer's CEPIO.

It is a further object of the present invention to allow for delivery of digitally based products, such as certificates of insurance, from the seller to the buyer according to the terms of the CEPIO and the cryptographic validation of such delivery.

It is another object of the present invention to allow for CEPIOs where more than one seller may bind the buyer to the CEPIO.

It is another object of the present invention to allow for CEPIOs where more than one buyer may bind the seller to the CEPIO.

Another object of the present invention is to show how all or parts of the system can be practiced using non-electronic means such as printed media or advertisements in newspapers.

These and other objects of the invention will be apparent to those skilled in the art from the following description of the invention, the accompanying drawings and the appended claims.

SUMMARY OF THE INVENTION

The present invention provides a method and apparatus for facilitating dual, bilateral seller-driven and buyer-driven commerce through the communication of binding conditional early payment incentive offers (CEPIOs), their acceptances, and payments, from a buyer to a seller or from a seller to a buyer. In a preferred embodiment, this invention allows sellers (providers of health care), who supply services and/or goods to others, and buyers (insurance companies, Medicare and Medicaid programs, et al), to communicate CEPIOs to each other, and, upon acceptance, to bind the other party to a contract. In a preferred embodiment, the apparatus includes a controller which transmits and receives CEPIOs from a buyer or a seller. Potential parties then have the option to accept a CEPIO and thus bind the other party to a contract. The controller then facilitates payments, and an explanation of payments, between a seller and a buyer. The important effects of this invention is that it produces a new alignment of financial incentives between sellers and buyers in a manner that benefits both parties, it lowers costs, and it significantly reduces the payment cycle time. This invention provides a new and unique mechanism for payers (buyers) to earn more money than they can earn by using "float," thereby increasing payer profitability and encouraging the early payment of provider claims. An earlier access to capital by providers (sellers) will improve a provider's cash flow, decrease account receivables, and decrease a provider's need for more expensive short-term financing. Additionally, the present invention can effectuate performance of the agreement between the payer (buyer) and provider (seller) by guaranteeing payer payments within a particular time-frame, and relevant provider payments, associated with the conditional early payment of a claim. The present invention is therefore a highly effective dual, bilateral seller-driven and buyer-driven commerce system which improves the ability of sellers to get paid faster for the services and/or goods they provide. It also allows buyers, by paying faster, to make more money than they can by stretching out the payment cycle over time to earn "float".

The method and apparatus of the present invention has many applications, however the examples used herein are descriptive of the health care insurance claims submission and payment process involving providers of health care.

In a preferred embodiment, the present invention provides a method and apparatus for payers (buyers) to conveniently communicate a CEPIO to providers (sellers), for providers to communicate to payers an acceptance of the CEPIO, for payers to bind a provider to a contract based on the provider's acceptance of the CEPIO, for payers to make electronic payments to providers within a timeframe specified in the CEPIO, for payers to transmit an electronic explanation of payments to providers, and for payers to be paid electronically for early payment of claims according to the terms of the CEPIO.

In another embodiment, the present invention provides a method and apparatus for providers (sellers) to conveniently communicate a CEPIO to payers (buyers), for payers to communicate to providers an acceptance of the CEPIO, for providers to bind a payer to a contract based on the payer's acceptance of the CEPIO, for payers to make electronic payments to providers within a timeframe specified in the CEPIO, for payers to transmit an electronic explanation of payments to providers, and for payers to be paid electronically for early payment of claims according to the terms of the CEPIO.

BRIEF DESCRIPTION OF THE DRAWINGS

FIG. 1 illustrates one embodiment of a conditional early payment incentive offer method to bind another party to a contract.

DETAILED DESCRIPTION OF THE INVENTION

CEPIO Terminology

Figure 2:
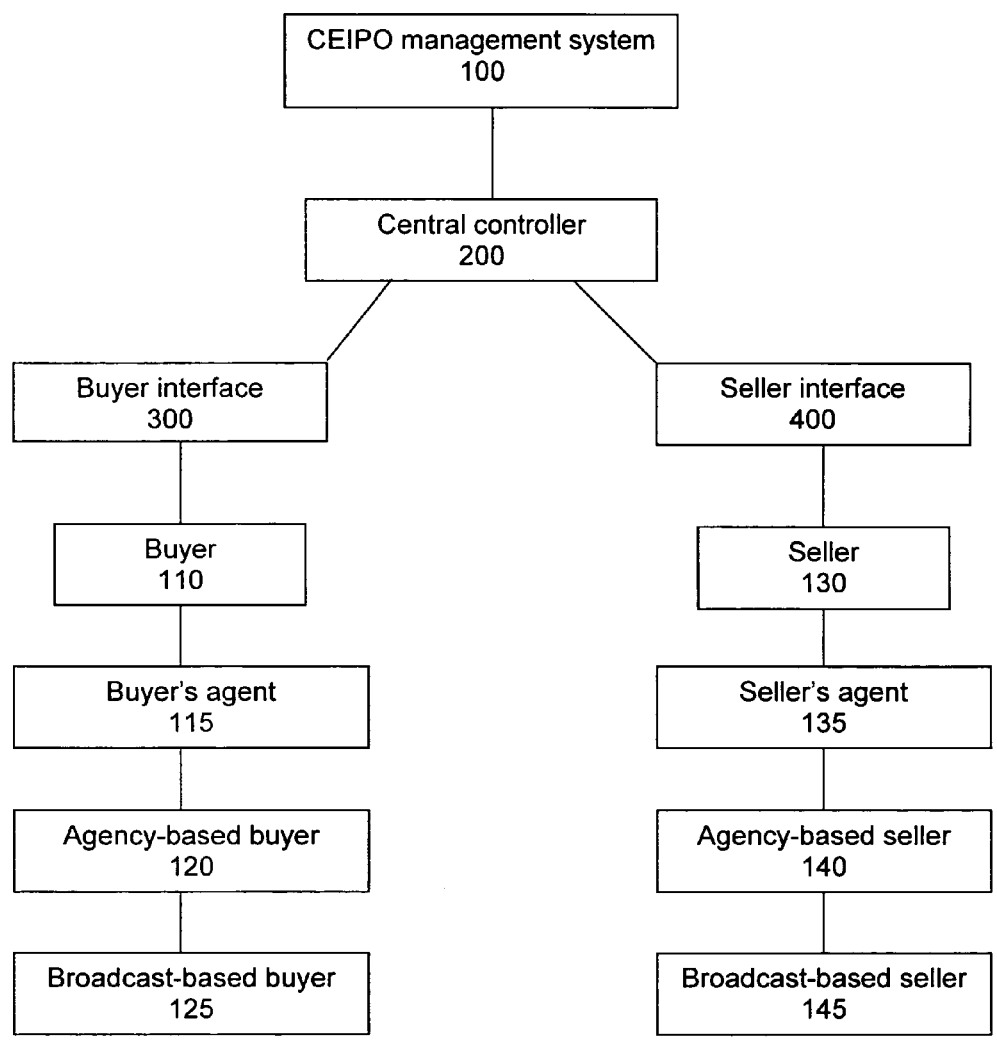
FIG. 2 is a block diagram showing one embodiment of the conditional early payment incentive offer management system.

As used herein, the following terms are defined to mean:

Agency-Based Buyer/Seller—A buyer/seller who has delegated authority to the CEPIO management system operator to accept or reject a given CEPIO using buyer/seller-defined CEPIO rules.

Broadcast-Based Buyer/Seller—A buyer/seller who has received a CEPIO from the CEPIO management system (directly or by, for example, access to an electronic posting) for evaluation.

Conditional Early Payment Incentive Offer (CEPIO)—Since the scope of the invention encompasses dual, bilateral seller-driven and buyer-driven offers, acceptances, and payments, when the offer is buyer-driven, a CEPIO may be defined as an offer containing one or more conditions submitted by a buyer to a seller for the purchase of goods and/or services at buyer-defined terms. When the offer is seller-driven, a CEPIO may be defined as an offer containing one or more conditions submitted by a seller to a buyer for the payment of goods and/or services at seller-defined terms.

Binding Conditional Early Payment Incentive Offer (Binding CEPIO)—A binding offer containing one or more conditions submitted by a buyer for the purchase of goods and/or services at a buyer-defined price. It also means a binding offer containing one or more conditions submitted by a seller for the sale of services and/or goods at a seller-defined price. As compared to a CEPIO, a binding CEPIO includes a payment guarantee, for example, the general purpose account numbers and an authorization to credit or debit the general purpose account upon acceptance of the CEPIO.

CEPIO Rule—A restriction defined by an agency-based buyer/seller under which the operator of the CEPIO management system may act as an agent to determine whether to accept or reject CEPIOs for that agency-based buyer/seller.

CEPIO Management System—The scope of the invention encompasses dual, bilateral seller-driven and buyer-driven offers, acceptances, and payments. When the offer is buyer-driven, a CEPIO management system may be defined as one or more controllers that receive and process CEPIOs for one or more services and/or goods, from one or more buyers, to determine if one or more sellers are willing to accept a CEPIO. When the offer is seller-driven, a CEPIO management system may be defined as one or more controllers that receive and process CEPIOs for one or more services and/or goods, from one or more sellers, to determine if one or more buyers are willing to accept a CEPIO.

General Purpose Account—Any account from which payment can be made, or to which a deposit can be made, including a checking, credit or debit account. The numbers associated with identifying a particular account are the general purpose account numbers.

Unless otherwise specified herein, when the phrase buyer is used, it may also be construed to encompass a buyer's agent, an agency-based buyer, or a broadcast-based buyer.

Likewise, when the phrase seller is used, it may also be construed to encompass a seller's agent, an agency-based seller, or a broadcast-based seller.

For illustrative purposes, in accordance with the present invention, FIG. 1 shows one embodiment of a method of one party binding a conditional early payment incentive offer (CEPIO 100) with another party for performance under a contract. At step 10, a seller (or buyer) inputs a CEPIO 100 into a computer. The CEPIO 100 is transmitted electronically to the buyer (or seller) at step 20. Step 30 shows the buyer (or seller) accepting the specific terms of CEPIO 100 and inputting an acceptance into the computer. The CEPIO 100 acceptance is transmitted electronically to the buyer (or seller) at step 40. The acceptance of CEPIO 100 by the buyer (or seller) binds the other party to a contract at step 50. The seller (or buyer) performs under the contract at step 60. The preceding is a partial illustration of the method of a dual, bilateral seller-driven and buyer-driven conditional early payment incentive offer, acceptance, and payment system. What follows are details of a preferred embodiment of the method and apparatus of the present invention.

As shown in FIG. 2, the method and apparatus of the present invention show a CEPIO management system 100 for transmitting, receiving, and processing CEPIOs 100 from one or more buyers. Since the method of the present invention is dual, bilateral seller-driven and buyer-driven, the CEPIO management system 100 may also be used for transmitting, receiving, and processing CEPIOs 100 from one or more sellers.

The CEPIO management system 100 determines whether a buyer or seller is willing to accept a given CEPIO 100. As discussed below, if a buyer or seller accepts a given CEPIO 100, the CEPIO management system 100 is operated to bind the other party on behalf of the accepting party, to a legally binding contract. In a preferred embodiment, the present invention includes a central controller 200, buyer interface 300, seller interface 400, and associated databases. The present invention receives CEIPOs 100 from buyers and sellers, makes them available for viewing by potential other parties to a transaction, and allows these other parties to bind them to a contract.

According to one feature of the present invention, the CPO management system 100 provides an optional agent feature that permits the buyer's agent 115 and/or the seller's agent 135 to initiate, accept or reject a given CEPIO 100 on behalf of a buyer 110 or seller 130.

According to another feature of the present invention, the CPO management system 100 provides an optional agency feature that permits the CEPIO management system 100 to accept or reject a given CEPIO 100 on behalf of certain agency-based buyers 120 and/or agency-based sellers 140 who have delegated authority to the CPO management system 100.

According to yet another feature of the present invention, the CPO management system 100 provides an optional feature that permits a broadcast-based buyer or a broadcast-based seller to receive a CEPIO 100 from the CEPIO management system 100 (directly or by, for example, access to an electronic posting) for evaluation.

System Architecture

The system architecture of a first embodiment of the apparatus and method of the present invention is illustrated with reference to FIGS. 2 through 6. As shown in FIG. 2, the apparatus of the present invention comprises a central controller 200, a buyer interface 300, and a seller interface 400 (collectively the "nodes"). The CEPIO management system 100, as well as any general-purpose computers utilized by buyers 110, or sellers 130, transmits digitally encoded data and other information between one another. Each node is connected via an Internet connection using a public switched phone network or cable network, such as those provided by a local or regional telephone operating company or a local or regional television cable company. Contact with CEPIO management system 100 may also be provided by facsimile, electronic mail, in-person contact or through an agent, dedicated data lines, fiber, cellular, Personal Communication Systems ("PCS"), Wi-Fi wireless, Bluetooth technology, microwave, or satellite networks. Buyer interface 300 and seller interface 400 are both input and output gateways for communication with central controller 200.

Using the above components, the present invention provides a method and apparatus to communicate CEPIOs 100, make them available to potential sellers and buyers, and allow the other party to a transaction to bind the offers to form a legally binding contract. The CEPIO management system 100 evaluates each received CEPIO 100 to identify CEPIOs 100 which are rejected by potential parties to a transaction. If the CEPIO management system 100 determines that a received CEPIO is rejected by potential parties to a transaction, or does not meet a CEPIO rule, the CEPIO management system 100 communicates this to the originating party.

Figure 3:
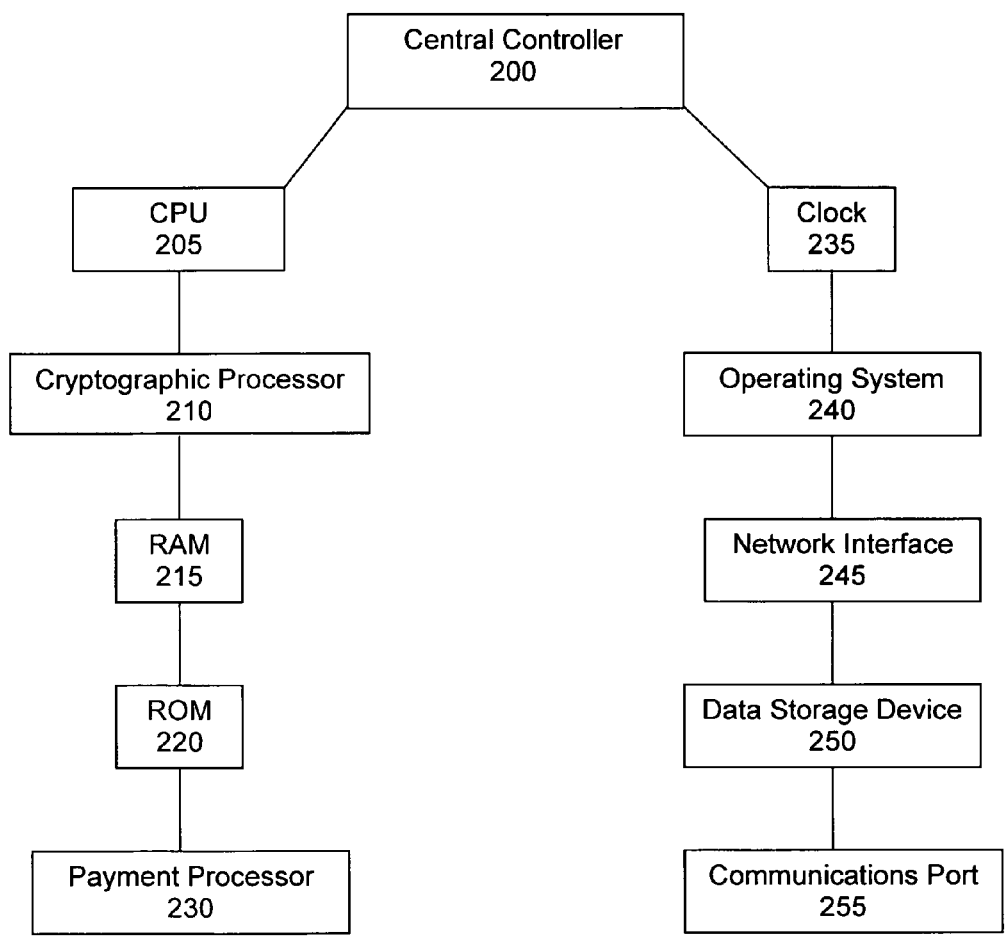
FIG. 3 is a block diagram showing one embodiment of the central controller.

FIG. 3 is a block diagram showing the architecture of an illustrative central controller 200. The central controller 200 includes a central processor (CPU) 205, cryptographic processor 210, a random access memory (RAM) 215, a read only memory (ROM) 220, payment processor 230, clock 235, operating system 240, network interface 245, data storage device 250, and a communications port 255. A conventional personal computer or a computer workstation with sufficient memory and processing capability may be used as central controller 200. In one embodiment it operates as a web server, both receiving and transmitting CEPIOs generated by buyers 110 and sellers 130 through CEPIO management system 100. The CPU 205 can be linked to each of the other listed elements, either by means of a shared data bus, or dedicated connections. The communications port 255 connects the central controller 200 to each buyer 110 and seller 130. The communications port 255 can include multiple communication channels for simultaneously establishing a plurality of connections.

The ROM 220 and/or data storage device 250 are operable to store one or more instructions, which the CPU 205 is operable to retrieve, interpret and execute. Payment processor 230 may also be configured as part of CPU 205. Payment processor 230 comprises one or more conventional microprocessors supporting the transfer and exchange of payments, charges, or debits, between buyers 110 and sellers 130, attendant to the method of the apparatus. The processing of such accounting transactions can be secured in a conventional manner, for example, using well-known cryptographic techniques. Cryptographic processor 210 supports the authentication of communications from buyers and sellers.

Figure 4:
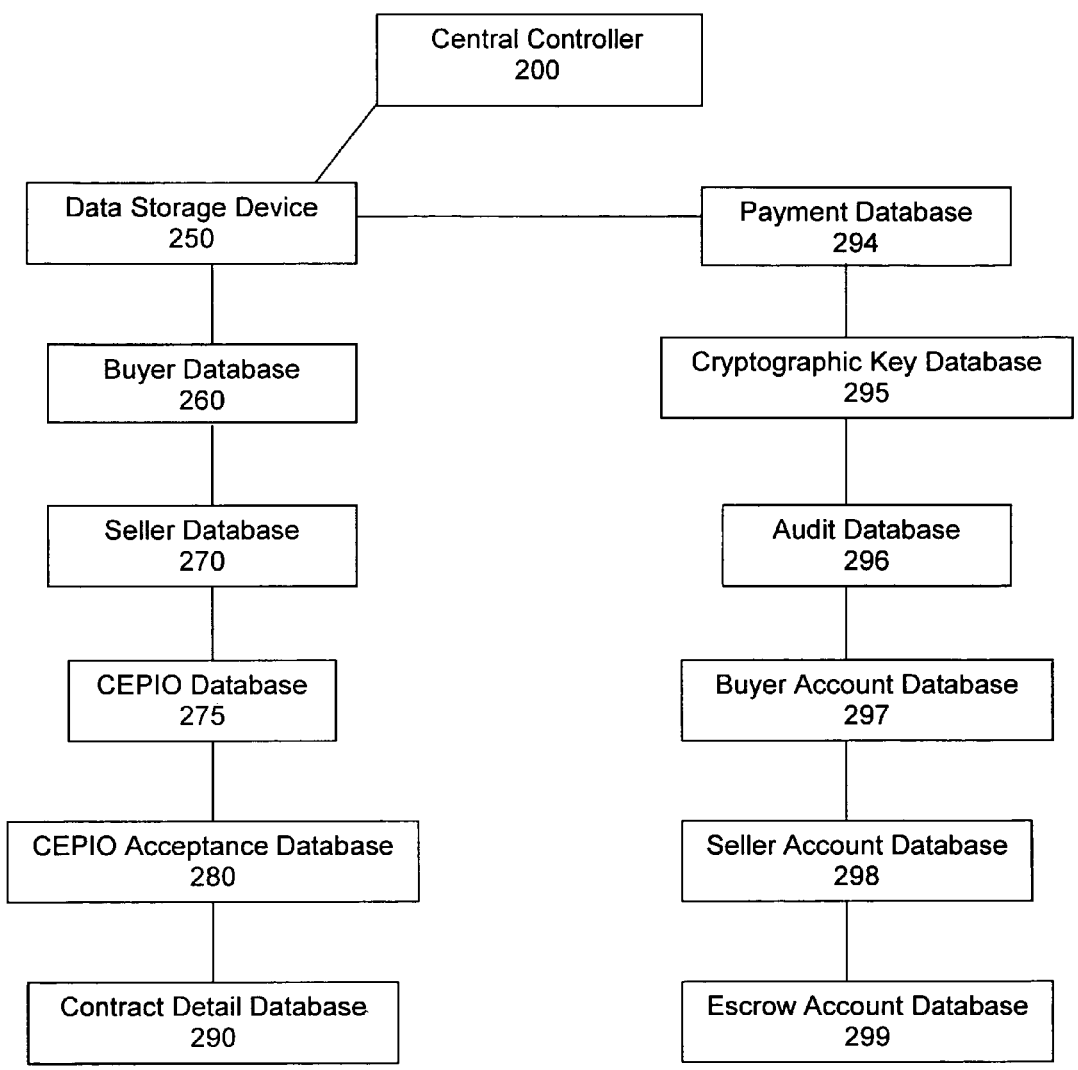
FIG. 4 is a block diagram showing one embodiment of the central controller databases.

FIG. 4 is a block diagram showing one embodiment of the databases in data storage device 250. Data storage device 250 may include hard disk magnetic or optical storage units, as well as CD-ROM drives or flash memory. Data storage device 250 contains databases used in the processing of transactions in the present invention, including buyer database 260, seller database 270, CEPIO database 275, CEPIO acceptance database 280, contract detail database 290, payment database 294, cryptographic key database 295, buyer account database 297, seller account database 298, and escrow account database 299.

Buyer database 260 contains the tracking number of each CEPIO 100 generated by a buyer 110 and the tracking number of each seller response 130 directed to the CEPIO management system 100. Seller database 270 contains the tracking number of each CEPIO 100 generated by the seller 130 and the tracking number of each buyer response 116 directed to the CEPIO management system 100.

CEPIO database 275 tracks all CEPIOs 100 directed to the CEPIO management system 100. CEPIO acceptance database 280 tracks to messages sent to the buyer 110 and seller 130 confirming completed transactions (bound contracts).

Contract detail database 290 contains form background provisions for inclusion in CEPIOs 100 directed to the CEPIO management system 100. These form provisions effectively fill the gaps between conditions specified by the buyer 110 or the seller 130, specifying the generic contract details common to CEPIOs 100 directed to the CEPIO management system 100.

Payment database 294 tracks all payments made by the buyer 110 and the seller 130, as well as general purpose account identifier numbers.

Cryptographic key database 295 facilitates cryptographic functions, storing both symmetric and asymmetric keys. These keys are used by cryptographic processor 210 for encrypting and decrypting CEPIOs 100 directed to the CEPIO management system 100, seller responses 130, seller agent responses 140, buyer responses 110, and buyer agent responses 120.

Audit database 296 stores transactional information relating to the posting of CEPIOs 100, allowing it to be retrieved for later analysis.

Buyer account database 297 tracks all information pertaining to the buyer's account. This account stores buyer 110 and general purpose account numbers.

Seller account database 298 tracks all information pertaining to the seller's 130 account. This account stores seller 130 and general purpose account numbers.

Escrow account 299 is an account which temporarily holds buyer 110 funds before they are placed in seller account 298. It also holds seller 130 funds before they are placed in buyer account 297.

Network interface 245 is connected with the Internet and is the gateway to communicate with buyers 110 and sellers 130 through respective seller interface 300 and buyer interface 400. Conventional modems may serve as network interface 245, but may combine such inputs into a T1 or T3 line. Alternatively, network interface 245 may be configured as a voice mail interface, web site, BBS, or electronic mail address.

While the above embodiment describes a single computer acting as central controller 200, those skilled in the art will realize that the functionality can be distributed over a plurality of computers. In one embodiment, central controller 200 is configured in a distributed architecture, wherein the databases and processors are housed is separate units or locations.

Figure 5:
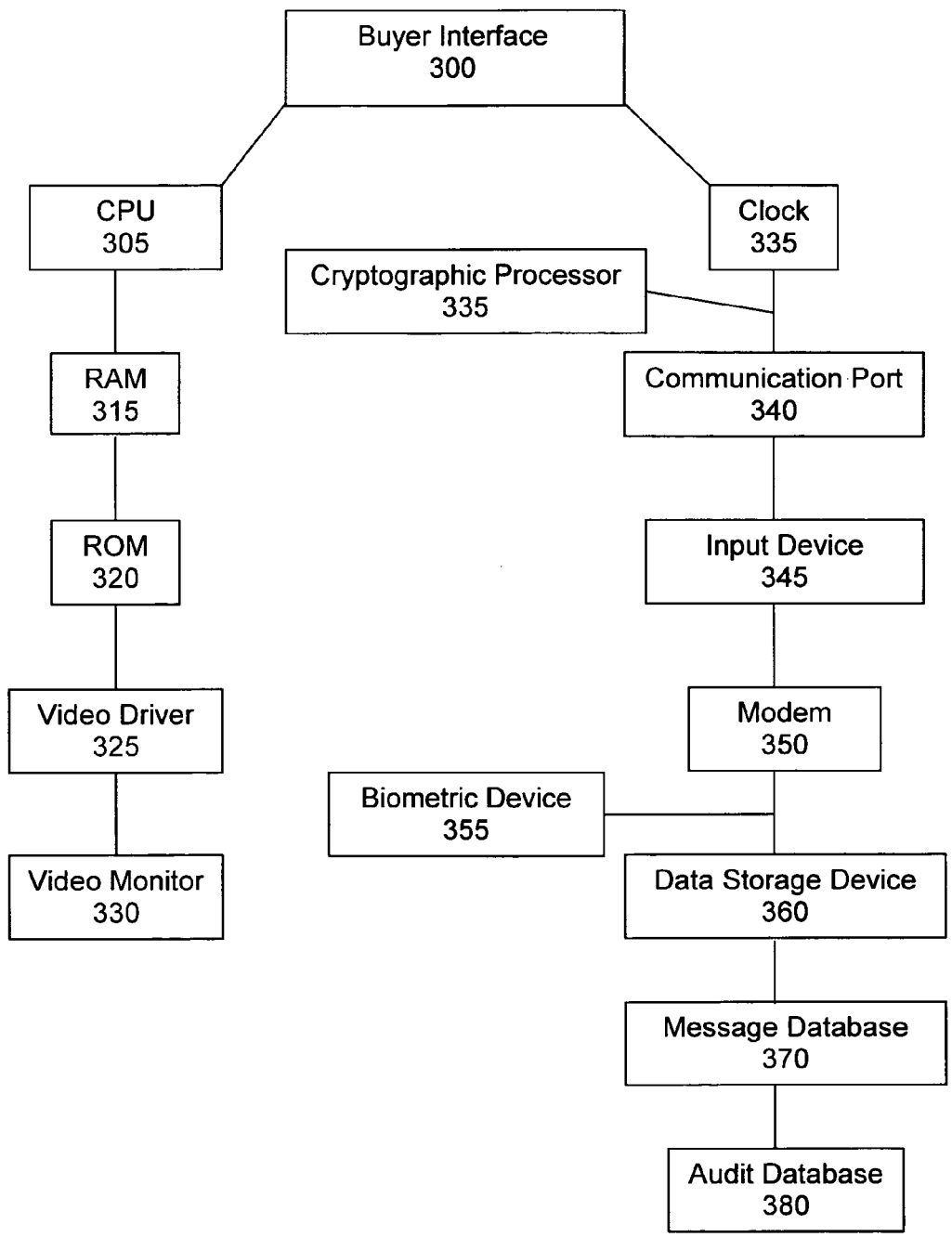
FIG. 5 is a block diagram showing one embodiment of the buyer interface.

FIG. 5 is a block diagram showing one embodiment of the buyer interface 300. It includes CPU 305, RAM 315, ROM 320, video driver 325, video monitor 330, clock 335, communication port 340, input device 345, modem 350, and data storage device 360. Cryptographic processor 335 and biometric device 355 may be added as stronger authentication as described later. Clock 335 is a standard chip-based clock which can serve to timestamp seller response 130 and buyer response 110, produced with buyer interface 300 and seller interface 400.

Data storage device 360 is a conventional magnetic-based hard disk storage unit. Message database 370 may be used for archiving seller responses 130 and buyer responses 110, while audit database 380 may be used for recording payment records and communications with central controller 200.

Figure 6:
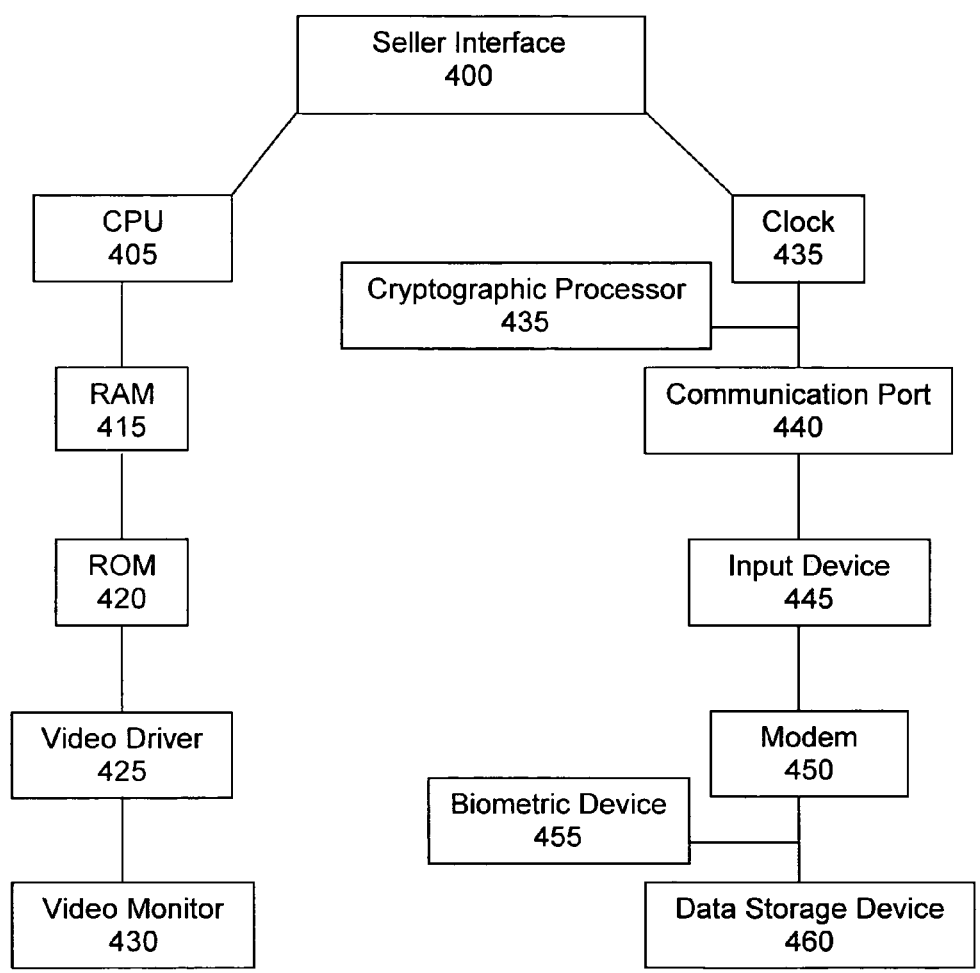
FIG. 6 is a block diagram showing one embodiment of the seller interface.

FIG. 6 is a block diagram showing one embodiment of the seller interface 400, the primary functionality being message creation and transmission. Seller interface 400 includes CPU 405, RAM 415, ROM 420, video driver 425, video monitor 430, clock 435, cryptographic processor 435, communication port 440, input device 445, modem 450, and data storage device 460. All of these components may be identical to those described in FIG. 5. No proprietary software is required.

Online Embodiment

In a preferred embodiment of the present invention, communications between buyers and sellers take place via electronic networks, with central controller 200 acting as a web server. In the buyer-driven embodiment of the present invention, the buyer logs on to the central controller 200, creates a CEPIO 100, transmits it to a seller, and then disconnects from the network. In the seller-driven embodiment of the present invention, the seller logs on to the central controller 200, creates a CEPIO 100, transmits it to a buyer, and then disconnects from the network.

The CEPIO management system 100 is made available to potential sellers by a buyer posting CEPIOs 100 on the web page of central controller 200. A buyer may also send written communications or electronic mail to sellers to make them aware of a CEPIO 100 posted on the web page of central controller 200. Periodic maintenance is performed by central controller 200 to ensure that CEPIOs 100 are acted upon in a timely manner. In the buyer-driven embodiment of the present invention, seller responses are submitted electronically to central controller 200 which contacts the buyer to indicate the CEPIO 100 has been bound. In the seller-driven embodiment of the present invention, buyer responses are submitted electronically to central controller 200 which contacts the seller to indicate the CEPIO 100 has been bound. Central controller 200 transfers general purpose account information to a buyer as soon as a CEPIO 110 is bound. Central controller 200 then utilizes the buyer interface 300 and the databases located in data storage device 250 to operate and cause the bound CEPIO 100 to be acted upon and produce the necessary messages and bank transfers utilizing general purpose accounts set up for that purpose.

Figure 7:
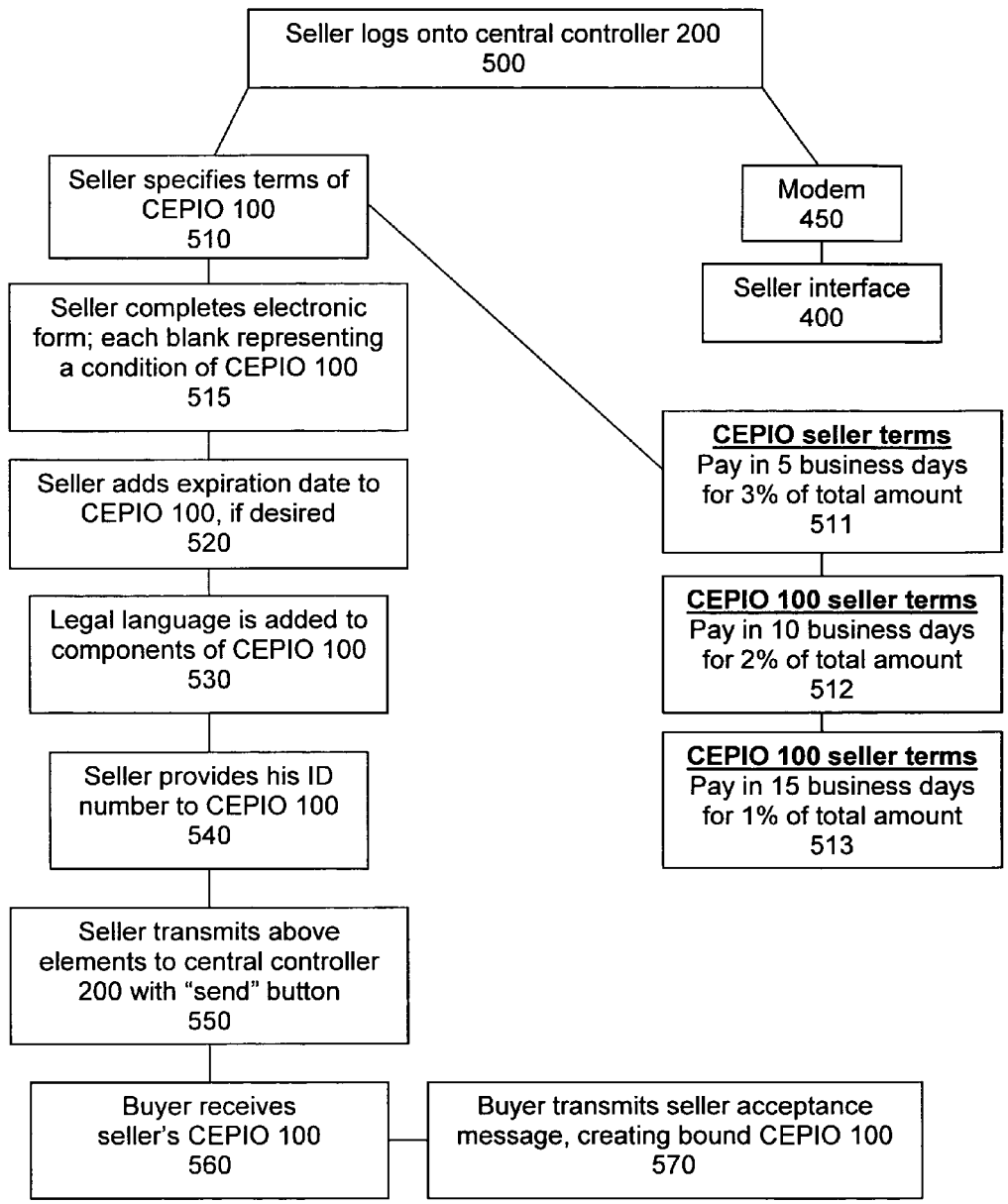
FIG. 7 illustrates an embodiment showing the process by which a seller formulates a conditional early payment incentive offer and a buyer binds the conditional early payment incentive offer.

With reference to FIG. 7, there is described the process by which the seller formulates a CEPIO 100 and a buyer accepts, creating a bound CEPIO 100. At step 500, the seller logs onto central controller 200 using seller modem 450 and seller interface 400, establishing a communication link. It should be noted that the seller or the buyer may be an individual, a corporation, a partnership, a government, or any other entity. In one embodiment, central controller 200 has a page on the world wide web, allowing the seller to provide information through the interface of conventional web browser software. At step 510, the seller specifies the time and payment terms of the CEPIO 100. As shown in boxes 511, 512, and 513, in one exemplary embodiment, the time for payment terms of the seller are specified in business days for the buyer to make an electronic funds transfer into the seller's general purpose account after a complete and accurate health care claim is received. Early payment incentive amounts from the seller to the buyer are associated with each specific payment timeframe, shown in the boxes 511, 512, and 513 as a percentage of the total health care claim reimbursement amount. As shown in box 515, after the seller selects the time and payment terms, a form is displayed on video monitor 430 of seller interface 400. This form is an electronic contract with a number of blanks to be filled out by the seller, with each blank representing a condition of CEPIO 100.

At step 520, the seller adds an expiration date to the CEPIO 100, if desired. This allows the seller to automatically stop all future CEPIO 100s at a specified date.

At step 530, boilerplate legal language is added to components of CEPIO 100 to form a complete CEPIO 100. The legal language is pulled from contract detail database 290 which stores a plurality of paragraphs. These paragraphs are linked together with the above contract elements to form a complete CEPIO 100.

At step 540, the seller attaches his name and unique seller (provider) identification number to CEPIO 100. This ID number is received from central controller 200. Central controller 200 maintains a database of seller ID numbers in seller database 298, and issues (or allows) only unique numbers. If additional security is required, those procedures described in the cryptographic embodiment may be implemented. In the health care embodiment, seller ID numbers may be assigned by the buyer (health plan) or may be assigned by the government as a National Provider Identifier (NPI). The NPI is a unique identification number for health care providers that will be used by all health plans. Health care providers and all health plans and health care clearinghouses will use the NPIs in the administrative and financial transactions specified by the Health Insurance Portability and Accountability Act of 1996 (HIPAA). The NPI must be used by most HIPAA covered entities, including health care providers, health plans, and health clearinghouses. The NPI will replace the health care provider identifiers currently in use. Health plans, including Medicare, Medicaid, and private insurers, must accept and use NPIs in standard electronic transactions by May 23, 2007. Small health plans have until May 23, 2008, to comply. By these deadlines, all health care providers must use only their NPIs as identifiers in standard electronic transactions. Standard electronic transactions include claims, eligibility inquiries and responses, claim status inquiries and responses, referrals, and remittance advices. The NPI contains no embedded intelligence; that is, it contains no information about the health care provider such as the type of health care provider or State where the health care provider is located.

Once the above elements have been developed, the seller transmits them to central controller 200 at step 550. The seller does this by clicking on the "send" button located on the screen in which he entered the terms of CEPIO 100.

At step 560, the buyer receives seller's CEPIO 100 from central controller 200. At step 570, the buyer transmits to the seller an acceptance message, creating a bound CEPIO 100.

Figure 8:
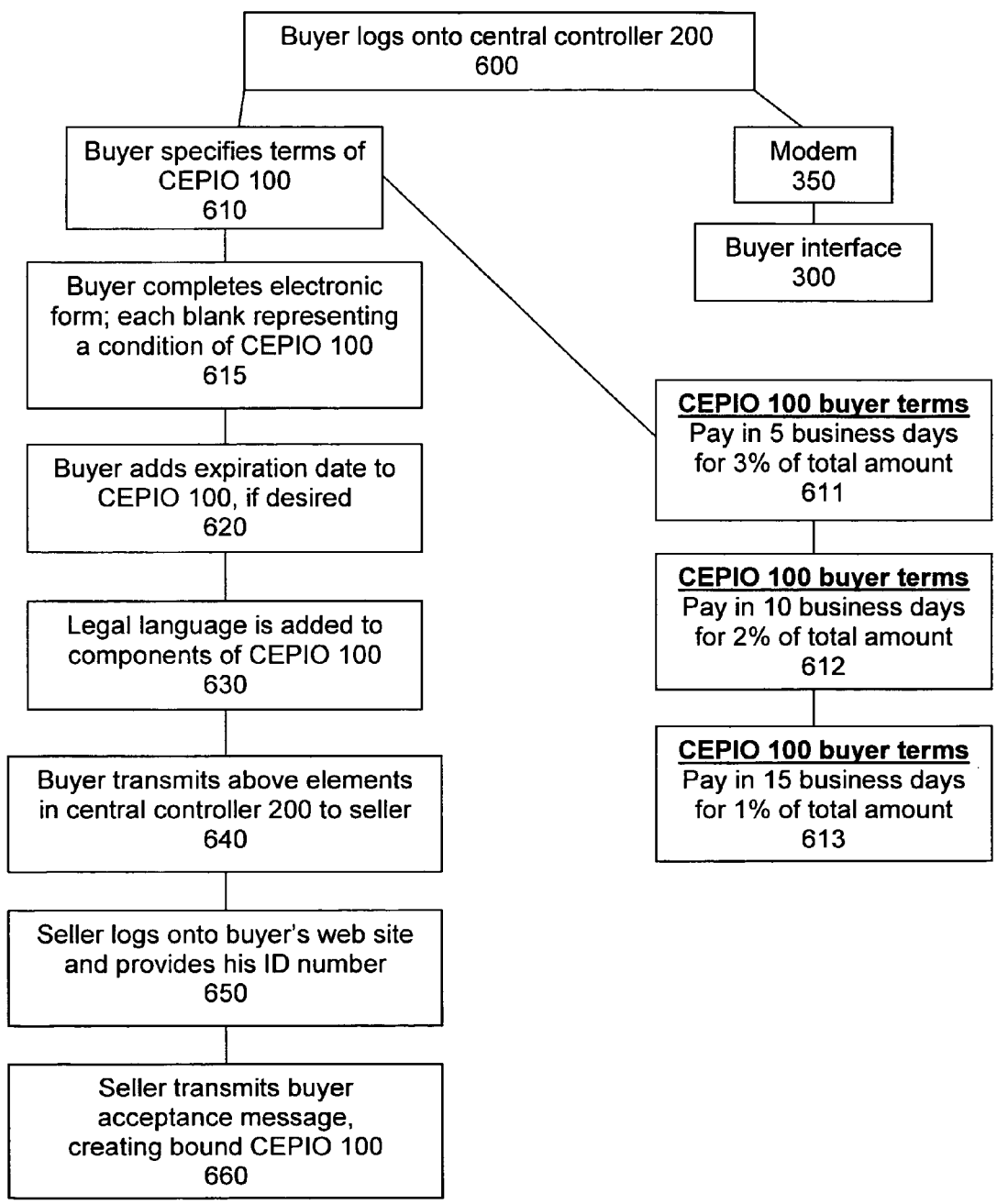
FIG. 8 illustrates an embodiment showing the process by which a buyer formulates a conditional early payment incentive offer and a seller binds the conditional early payment incentive offer.

FIG. 8 describes the process by which the buyer formulates a CEPIO 100 and a seller accepts, creating a bound CEPIO 100. At step 600, the buyer logs onto central controller 200, using buyer modem 350 and buyer interface 300. It should be noted that the buyer or seller may be an individual, a corporation, a partnership, a government, or any other entity. In one embodiment, central controller 200 has a page on the world wide web, allowing the buyer to provide information through the interface of conventional web browser software. At step 610, the buyer specifies the time and payment terms of the CEPIO 100. As shown in boxes 611, 612, and 613, the time for payment to the seller is specified by the buyer in business days for the buyer to make an electronic funds transfer into the seller's general purpose account after a complete and accurate health care claim is received.

Early payment incentive amounts from the seller to the buyer are associated with each specific payment timeframe, shown in the boxes 611, 612, and 613 as a percentage of the total health care claim reimbursement amount. As shown in box 615, after the buyer selects the time and payment terms, a form is displayed on video monitor 330 of buyer interface 300. This form is an electronic contract with a number of blanks to be filled out by the buyer, with each blank representing a condition of CEPIO 100.

At step 620, the buyer adds an expiration date to the CEPIO 100, if desired. This allows the buyer to automatically stop all future CEPIO 100s at a specified date.

At step 630, boilerplate legal language is added to components of CEPIO 100 to form a complete CEPIO 100. The legal language is pulled from contract detail database 290 which stores a plurality of paragraphs. These paragraphs are linked together with the above contract elements to form a complete CEPIO 100. At step 640, central controller 200 then sends CEPIO 100 electronically to sellers, either individually or in groups. If additional security is required, those procedures described in the cryptographic embodiment may be implemented.

At step 650, the seller logs onto the buyer's web site and provides his ID number. The seller incorporates seller response 130 into CEPIO 100, signing CEPIO 100 by adding an indication that the contract is agreed to. This indication could be a digital signature, or could involve adding a symbol or indicia representative of the seller.

At step 660, the seller accepts the CEPIO 100 on the buyer's web site, thus creating a bound CEPIO 100. Central controller 200 sends the seller a confirming message of the bound CEPIO 100 transaction to the seller.

Figure 9:
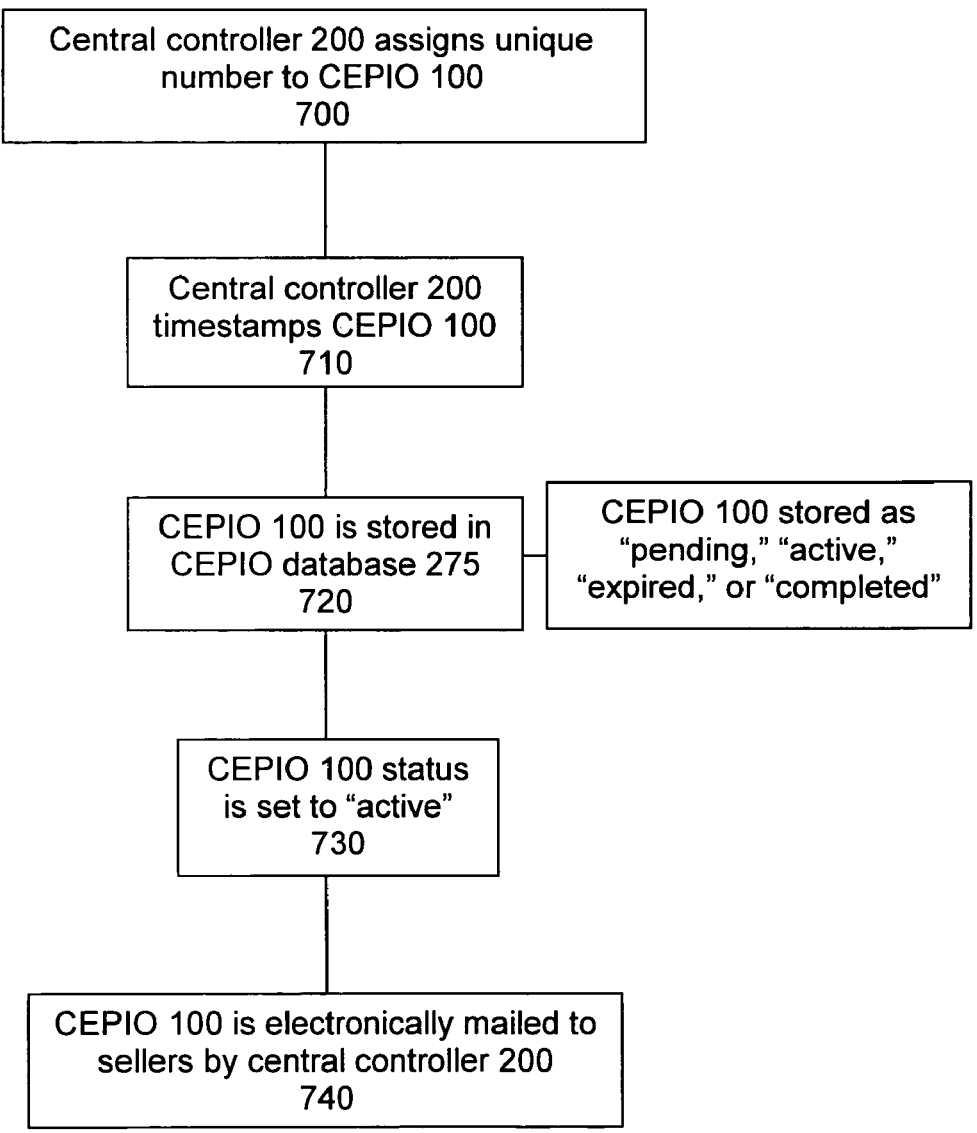
FIG. 9 illustrates an embodiment showing the process by which a conditional early payment incentive offer is activated and made available to potential sellers.

Referring to FIG. 9, there is illustrated an embodiment in which CEPIO 100 is activated and made available to potential sellers. At step 700, a unique tracking number is added to CEPIO 100. Central controller 200 timestamps CEPIO 100 at step 710, and then stores CEPIO 100 in CEPIO database 275. CEPIO database 275 contains a record for each CEPIO 100, and includes fields such as status, subject, tracking number, timestamp, description of goods and/or services, expiration date, conditions, and seller ID number. The status field has values of "pending," "active," "expired," and "completed." A status of "pending" means the CEPIO 100 is not currently available to sellers or buyers. Either it is still being processed by central controller 200, or it has been temporarily suspended by the seller or buyer. An "active" CEPIO 100 is available to potential sellers and buyers and can be bound. An "expired" CEPIO 100 can no longer be bound. CEPIOs 100 which have been bound by a seller or buyer have a status of "completed."

After being stored at step 720, CEPIO 100 may go through a series of processing steps. One step, if necessary, is to edit for spelling or grammatical errors. CEPIO 100 might also be reviewed for clarity. Any CEPIO 100 with an unclear term or condition would be returned to the seller for clarification. The status of the database record for CEPIO 100 is set to "active" at step 730. CEPIO 100 is electronically mailed to potential sellers, either individually or in groups.

In an embodiment in which CEPIOs 100 are being transmitted to the seller, it is important to note that there are a number of hardware options for seller interface 400. Suitable seller interfaces 400 include fax machines, PDAs with wireless connections, and beepers or pagers. For example, a health care provider (seller) could instruct central controller 200 to provide details of CEPIO 100 over the beeper network, or informing the seller to log on to central controller 200 for further details.

Figure 10:
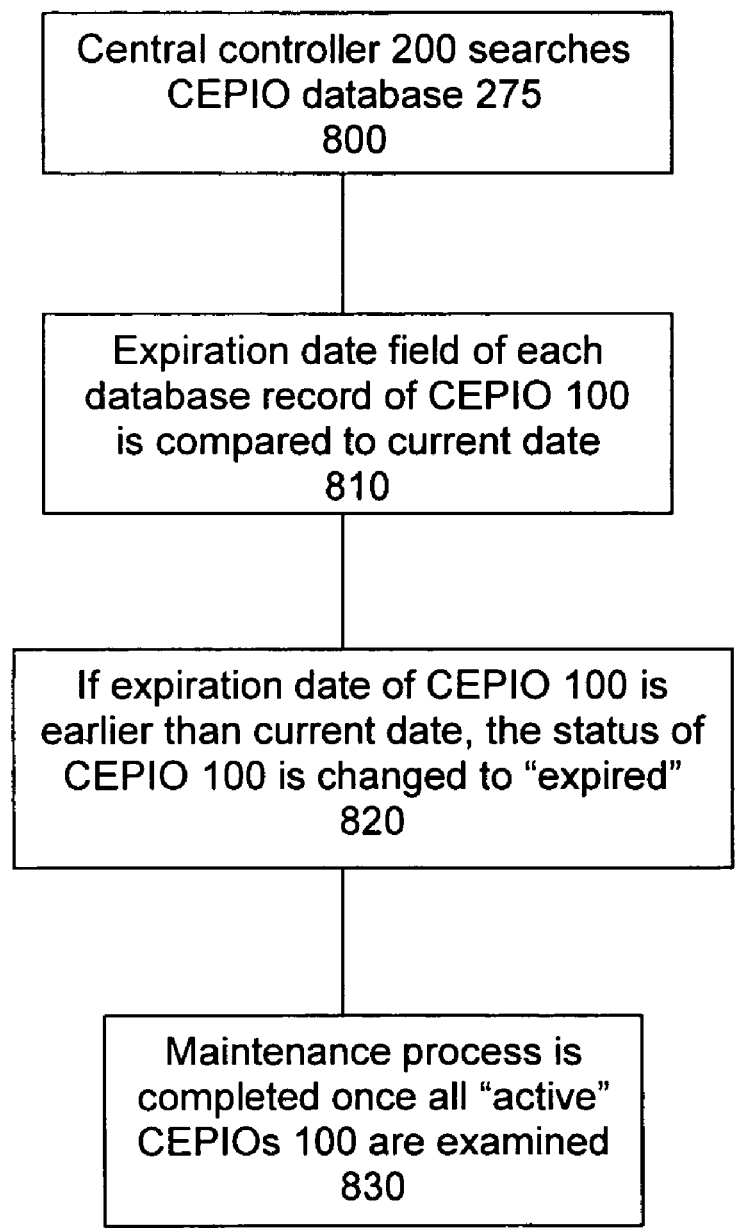
FIG. 10 illustrates one embodiment showing of the maintenance of active conditional early payment incentive offer.

FIG. 10 illustrates one embodiment of a procedure for maintenance of CEPIOs 100. At step 800, central controller 200 searches CEPIO database 275. At step 810 the expiration date field of each database record of CEPIO 100 is compared to the current date. If the expiration date of CEPIO 100 is earlier than the current date, the status of CEPIO 100 is changed to "expired" at step 820. The maintenance process is completed at step 830 once all "active" CEPIO 100 database records have been examined.

Figure 11:
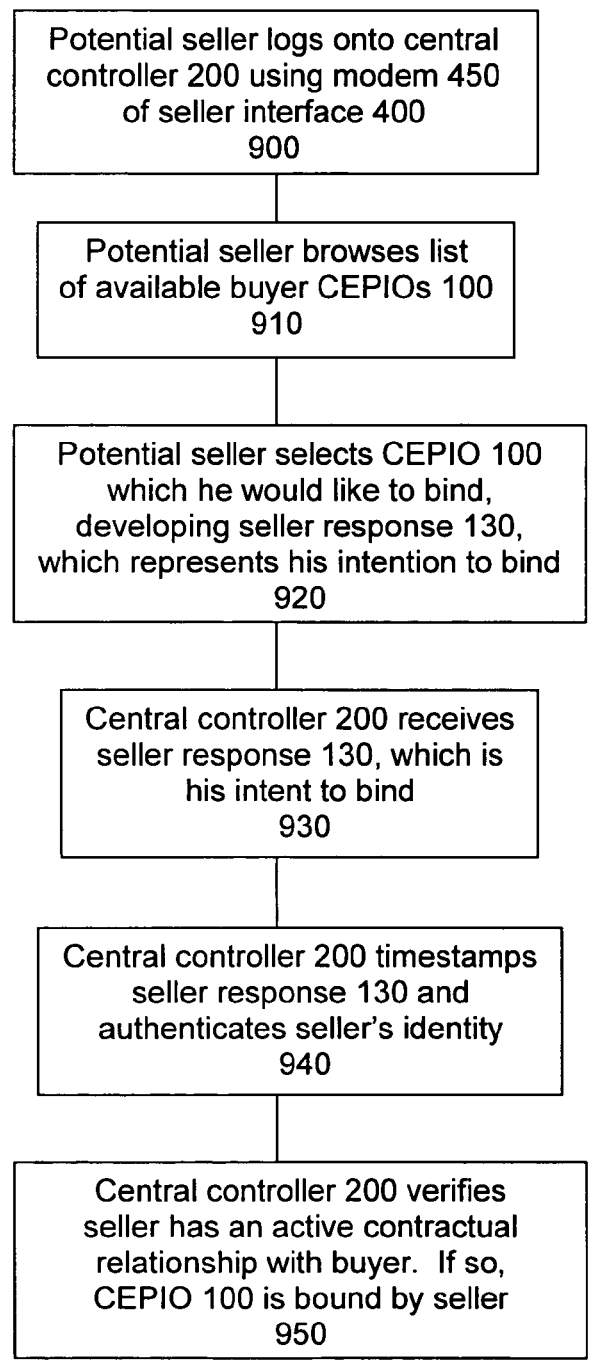
FIG. 11 illustrates an embodiment showing a process by which a seller binds a conditional early payment incentive offer.

FIG. 11 illustrates one embodiment of a process by which a seller binds a CEPIO 100. At step 900, the potential seller logs onto central controller 200 using modem 450 and seller interface 400. At step 910, the potential seller browses a list of available buyer CEPIOs 100. At step 920 the potential seller selects CEPIO 100 which he would like to bind, developing seller response 130, which represents his intent to bind.

At step 930, central controller 200 receives seller response 130 from the potential seller. Seller response 130 includes seller's general purpose account identifying numbers to facilitate payments. Central controller 200 then timestamps seller response 130 and authenticates the identity of the seller at step 940. The timestamp allows central controller 200 to keep an exact record of the time of each transaction. Authentication of the seller's identity involves central controller 200 extracting the seller ID from seller response 130 and looking up the seller's identity in seller account database 298. At step 950, central controller 200 verifies that the seller has an active and valid contractual relationship with the buyer by looking up the seller's identity in seller database 298. For instance, in a preferred health care embodiment, an insurance plan may have a closed network of providers with which they conduct business. An insurance plan may only need or desire a certain number of general surgeons to provide health care services to a given population in a market service area. Further, a buyer may not wish to do business with a general surgeon who, for example, has a substance abuse problem and who may have lost, or may have limited, privileges to practice surgery because of quality issues surrounding surgical misadventures. The buyer may also provide general surgeons in his network with preferred pricing over general surgeons who are not in the buyer's network. Central controller 200 verifies the general surgeon is in the buyer's network and therefore is eligible to enter into and bind a CEPIO 100. Once the verification occurs, the CEPIO 100 is bound by the seller.

In another embodiment, the seller incorporates seller response 130 into CEPIO 100, signing CEPIO 100 by adding an indication that the contract is agreed to. This indication could be a digital signature, or could involve adding a symbol or indicia representative of the seller.

Those familiar with the art will understand that the scope and intent of the present invention is not limited by the above embodiment of a process by which a seller binds a CEPIO 100. For instance, there exist other embodiments which function without the requirement of a prior active and valid contractual relationship being in place between the buyer and a seller before a CEPIO 100 can be bound.

Figure 12:
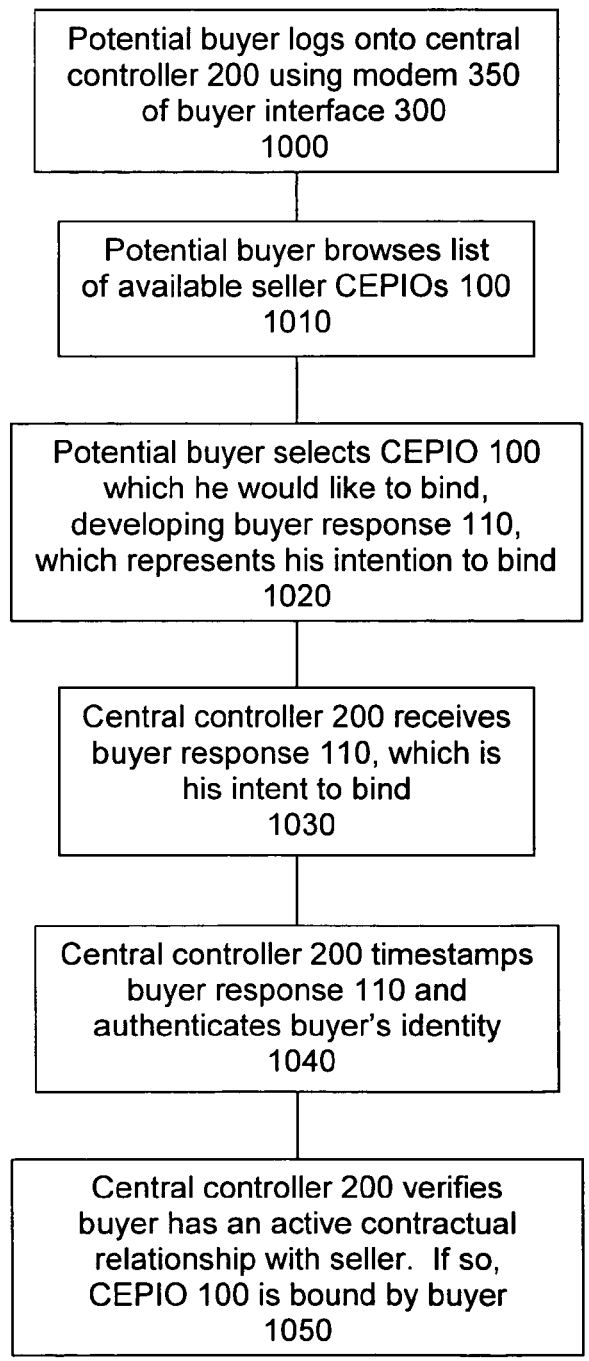
FIG. 12 illustrates an embodiment showing a process by which a buyer binds a conditional early payment incentive offer.

FIG. 12 illustrates one embodiment of a process by which a buyer binds a CEPIO 100. At step 1000, the potential buyer logs onto central controller 200 using modem 350 and buyer interface 300. At step 1010, the potential buyer browses a list of available seller CEPIOs 100. At step 1020 the potential buyer selects CEPIO 100 which he would like to bind, developing buyer response 110, which represents his intent to bind.

At step 1030, central controller 200 receives buyer response 110 from the potential buyer, which is his intent to bind. Central controller 200 then timestamps buyer response 110 and authenticates the identity of the buyer at step 1040. Authentication of the buyer's identity involves central controller 200 extracting the buyer ID from buyer response 110 and looking up the buyer's identity in buyer account database 297. At step 1050, central controller 200 verifies that the buyer has an active and valid contractual relationship with the seller by looking up the buyer's identity in buyer account database 297. Once the verification occurs, the CEPIO 100 is bound by the buyer.

In another embodiment, the buyer incorporates buyer response 110 into CEPIO 100, signing CEPIO 100 by adding an indication that the contract is agreed to. This indication could be a digital signature, or could involve adding a symbol or indicia representative of the buyer.

Those familiar with the art will understand that the scope and intent of the present invention is not limited by the above embodiment of a process by which a buyer binds a CEPIO 100. For instance, there exist other embodiments which function without the requirement of a prior active and valid contractual relationship being in place between the buyer and a seller before a CEPIO 100 can be bound.

Figure 13:
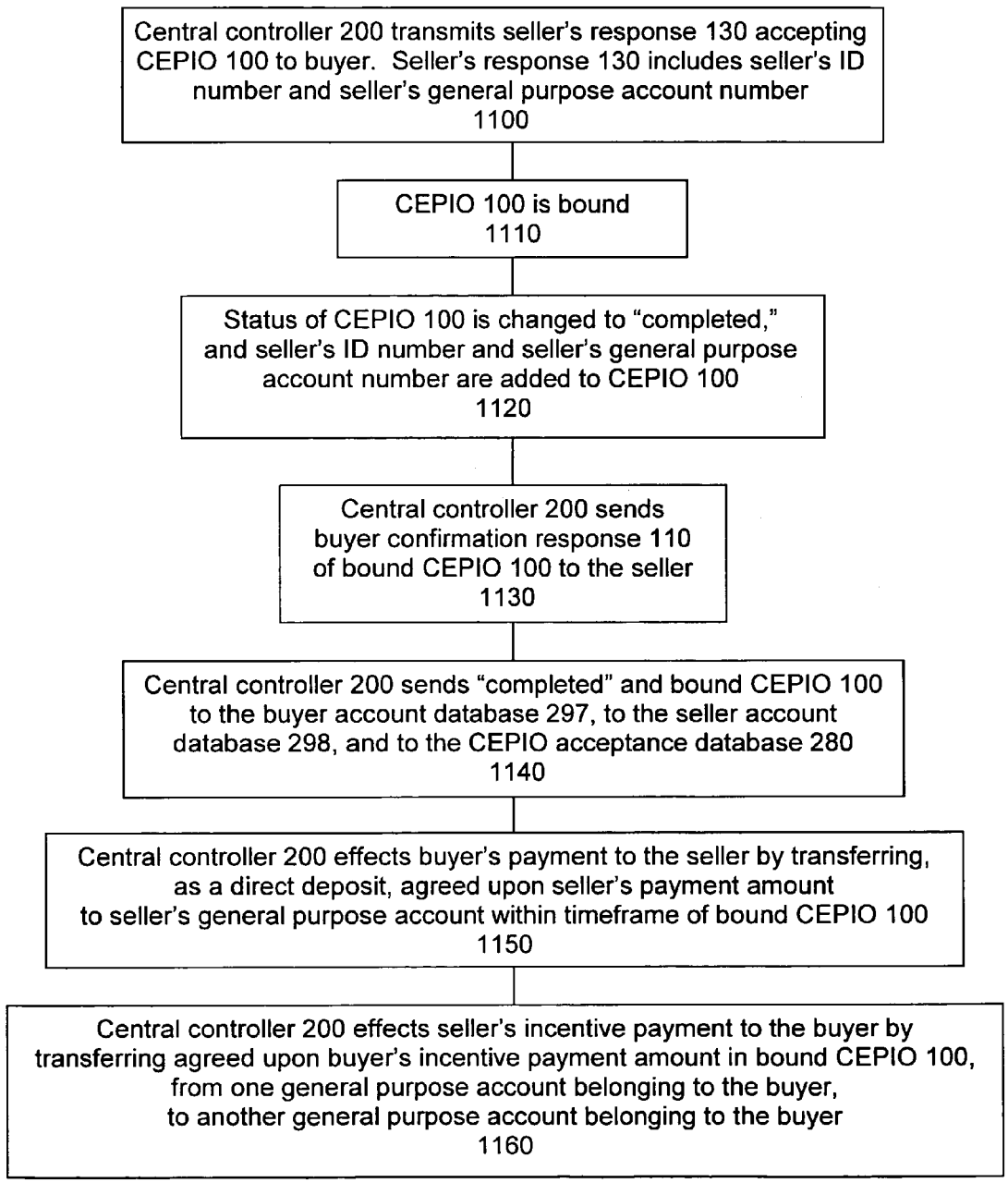
FIG. 13 illustrates one embodiment showing an exemplary procedure of a seller and buyer payment process for a bound conditional early payment incentive offer.

FIG. 13 illustrates one embodiment of a seller and buyer payment process for a bound CEPIO 100. At step 1100, central controller 200 transmits a seller's response 130, to a buyer, in which the seller accepts a CEPIO 100. The seller's response 130 includes the seller's ID number and the seller's general purpose account number. At step 1110, CEPIO 100 is "bound," turning CEPIO 100 into a legally binding contract between the buyer and seller. The binding process requires that the status of CEPIO 100 be changed to "completed." The binding process also requires that the seller ID and the seller's general purpose account number be added to CEPIO 100. These are accomplished at step 1120. At step 1130, central controller 200 sends a buyer confirmation response 110 of the bound CEPIO 100 to the seller. At step 1140, central controller 200 sends "completed" and bound CEPIO 100 to the buyer database 297, to the seller account database 298, and to the CEPIO acceptance database 280.

At step 1150, central controller 200 effects the buyer's payment to the seller by transferring a payment amount from the buyer's general purpose account into the seller's general purpose account, as an electronic funds transfer, within the timeframe specified in the bound CEPIO 100. For example, payment is made within 5, 10 or 15 business days. The payment amount made by the buyer to the seller is the agreed upon reimbursement amount in the bound CEPIO 100. The transfer of payments is accomplished through use of the buyer's and seller's general purpose account numbers and the names of their banks.

Any one, or all, of the following conditions may be operable in a CEPIO 100, depending on the terms stipulated and agreed to in the bound CEPIO 100. In one embodiment, for example, the buyer may deduct 3% of the total seller's reimbursement amount, if an electronic funds transfer payment is made by the buyer to the seller within 5 business days as agreed upon in CEPIO 100. Also, the buyer may deduct 2% of the total seller's reimbursement amount, if an electronic funds transfer payment is made by the buyer to the seller within 10 business days. And further, the buyer may deduct 1% of the total seller's reimbursement amount, if an electronic funds transfer payment is made by the buyer to the seller within 15 business days. In one preferred health care related embodiment, the seller's total reimbursement amount may not be what the seller charges for specific goods and/or services, but a price amount specified by the buyer in pricing agreements with the seller, or in pricing schedules which are defined by the buyer as usual and customary for a geographic region, or reimbursement amounts as specified in the bound CEPIO 100. Such reimbursement variations are familiar to those experienced in the art.

At step 1160, central controller 200 transfers the agreed upon buyer's incentive payment amount in the bound CEPIO 100, from one general purpose account belonging to the buyer, to another general purpose account belonging to the buyer. This is accomplished through use of the buyer's general purpose account numbers and the name of the bank(s). Thus, incentive payment is effected by the seller to the buyer for paying the agreed upon reimbursement amount within the method and timeframe specified in the CEPIO 100.

In another embodiment, multiple sellers may bind CEPIO 100. In this case, CEPIO 100 may maintain its status of "active" for a certain timeframe or until a given number of sellers have responded, and only then is the status of CEPIO 100 changed to "completed." Another option is to open CEPIO 100 to any number of bindings, or any number of bindings up to the funds available to the buyer.

There are many methods by which the providers of the system could derive a revenue stream. In one embodiment, a flat fee is charged for every CEPIO 100 submitted. There could also be flat fees that would cover any number of CEPIOs 100 over a given period of time, allowing buyers to subscribe to the service much as they would subscribe to a newspaper. In another embodiment, central controller 200 calculates a discounted value of the price in which sellers or buyers receive only a percentage of the price of the CEPIO 100. In another embodiment, the providers of the system could receive an amount related to a dollar volume generated through the system for the buyer. For example, in return for making the system available at no front end or continuing charge to a buyer, a third-party agent could receive a certain amount for every dollar generated in new revenue to the buyer as a result of seller's incentive payments resulting from CEPIOs 100. In another embodiment, advertisers could pay to have messages listed along with CEPIOs 100, supplementing the costs of operating the system. Alternatively, the method and apparatus of the present invention may be employed without a payment feature.

Payment Preferences

Preferred methods of payment might include electronic funds transfer, digital money, credit cards, personal checks, etc. In one embodiment, buyers could transfer money to central controller 200 to be stored in buyer account 297, which would operate as a conventional checking account. Central controller 200 would send a check to the seller written on buyer account 297. These payment methods are meant to be merely illustrative, however, as there are many equivalent payment methods commonly known in the art which may also be used.

The above protocols may be similarly applied to sellers, allowing for the creation of seller account 298. The primary difference being that seller account 298 is primarily used for deposits.

Another method of payment involves procedures using digital cash. Central controller 200 looks up the buyer's electronic delivery address in payment database 294. This address is transmitted to payment processor 230, with the digital cash being downloaded from the buyer. Central controller 200 updates payment database 294 to indicate that payment has been made. This address might be an electronic mail address if the digital cash is to be transferred by electronic mail, or it could be an Internet Protocol address capable of accepting an on-line transfer of digital cash. This delivery address is sent to payment processor 230. The digital cash is downloaded to seller account 298 or directly to the seller. Central controller 200 then updates payment database 294 to indicate that payment has been made. Using these cash protocols, it is possible for the buyer to include payment along with CEPIO 100 in electronic form.

The practice of using digital cash protocols to effect payment is well known in the art and need not be described here in detail.

Delayed Payment Embodiment

Although the on-line embodiment describes a protocol in which sellers receive payment within a certain timeframe spelled out in a bound CEPIO 100, other embodiments may be implemented in which payment is delayed until goods and/or services are received by the buyer, or delayed until some predetermined date. Partial payments and installment payments are also supported by the system.

Off-Line Embodiment

In one embodiment of the present invention, buyers and sellers communicate in an off-line manner with central controller 200. Rather than sending electronic mail or using web-based servers, buyers and sellers use a telephone, fax machine, postal mail, and other off-line communication tools.

A buyer or seller may use a telephone, for example, to generate CEPIO 100. The buyer or seller calls central controller 200 and is connected with an agent. The buyer or seller provides his ID number, password or private key so that central controller 200 can authenticate his identity. The agent puts this data into digital form by typing it into a terminal and then adds legal language to form CEPIO 100. CEPIO 100 is then transmitted to central controller 200 where it is made available to potential sellers or buyers as described in the on-line embodiment.

In an alternative embodiment, the buyer or seller calls central controller 200 and is connected with a conventional Interactive Voice Response Unit (IVRU) which allows the buyer or seller enter some or all of the terms of CEPIO 100 without the use of a live agent. The buyer initially selects from a menu of subjects using the touch-tone keys of his phone, and then the call is either directed to a live agent or the buyer is prompted for further terms of CEPIO 100.

Potential buyers or sellers may also use a telephone to browse and bind CEPIOs 100. The potential buyer or seller calls central controller 200. Central controller 200 then converts the text of each CEPIO 100 into audio form, reading to the potential buyer or seller. At any time during the reading of CEPIOs 100, the potential buyer or seller may press a combination of keys on his telephone to select a CEPIO 100 for binding.

Buyers or sellers may also communicate with an agent at central controller 200 through faxes or postal mail. The agent receives the message and proceeds to digitize it and form CEPIO 100 as described above.

Cryptographic Authentication Embodiment

In the previous embodiments, authentication of the buyer and seller involves checking the attached ID or name and comparing it with those in a buyer database 260 and seller database 270. Although this procedure works well in a low security environment, it can be significantly improved through the use of cryptographic protocols. These protocols not only enhance the ability to authenticate the sender of a message itself, proving that it has not been altered during transmission. Such techniques shall be referred to generally as cryptographic assurance methods, and will include the use of both symmetric and asymmetric keys as well as digital signatures and hash algorithms.

The practice of using cryptographic protocols to ensure the authenticity of senders as well as the integrity of messages is well known in the art and need not be described here in detail.

Figure 14:
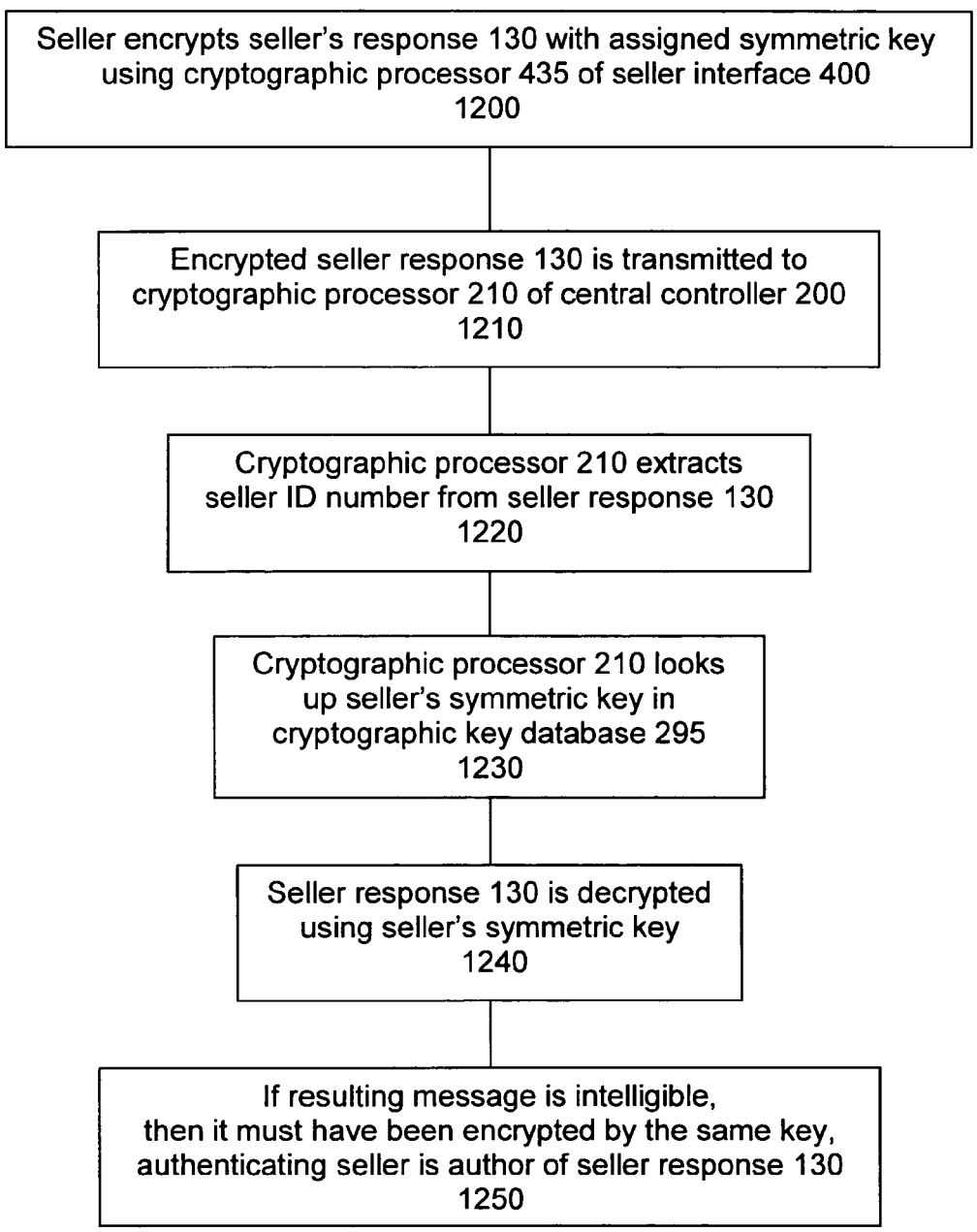
FIG. 14 through 17 illustrates an exemplary authentication procedure using cryptographic protocols.

FIG. 14 describes a symmetric key embodiment in which the seller and central controller 200 share a key. Thus both encryption and decryption of seller response 130 are performed by the same key. The seller encrypts seller response 130 with his assigned symmetric key at step 1200, using cryptographic processor 435 of seller interface 400. The key may be stored in message database 370 or otherwise stored or memorized by the seller. The encrypted seller response 130 is then transmitted to cryptographic processor 210 of central controller 200 at step 1210. Cryptographic processor 210 extracts the seller ID from seller response 130 at step 1220 and looks up the symmetric key of the seller in cryptographic key database 295 at step 1230, decrypting seller response 130 with this key at step 1240. Cryptographic key database 295 contains algorithms and keys for encrypting, decrypting and/ or authenticating messages. At step 1250, if the resulting message is intelligible, then it must have been encrypted by the same key, authenticating that the seller must have indeed been the author of seller response 130.

This procedure makes it significantly more difficult for an unauthorized seller to represent himself as a legitimate seller. Without cryptographic procedures, an unauthorized seller who obtained a sample seller response 130 from a legitimate seller would be able to extract the seller ID and then attach this ID number to unauthorized seller response 130. When seller response 130 has been encrypted with a symmetric key, however, an unauthorized seller obtaining a sample seller response 130 only discovers the seller's ID number, not the symmetric key. Without this key, the unauthorized seller cannot create a seller response 130 that will be discovered by central controller 200, since he cannot encrypt his message in the same way that the authorized seller could. The symmetric key protocol also ensures that seller response 130 has not been tampered with during transmission, since alteration of the message requires knowledge of the symmetric key. An encrypted seller response 130 also provides the seller with more anonymity.

Figure 15:
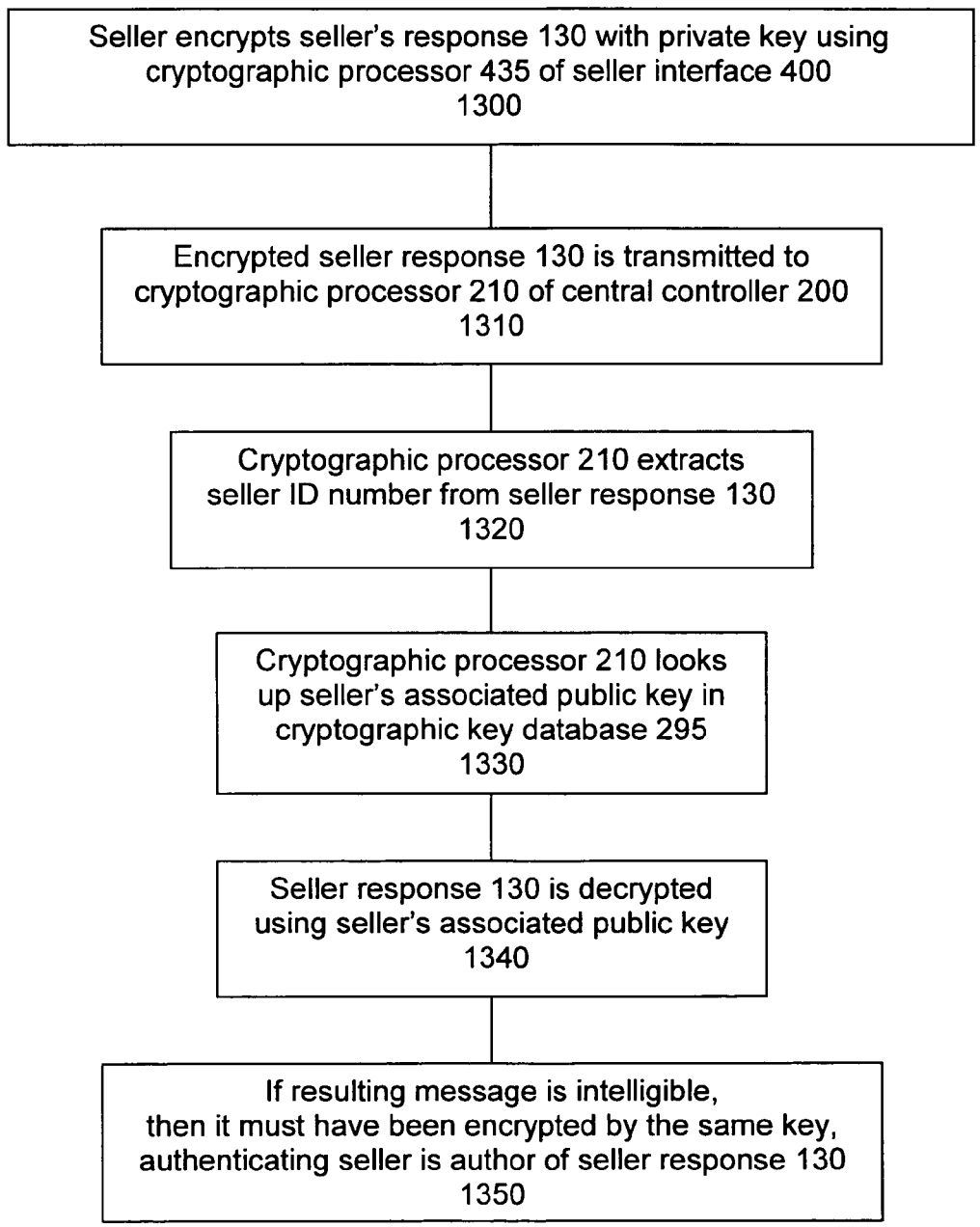

Referring now to FIG. 15, there is shown an asymmetric key protocol in which seller response 130 is encrypted with a private key and decrypted with a public key. At step 1300, the seller encrypts seller response 130 with his private key using cryptographic processor 435, transmitting seller response 130 to central controller 200 at step 1310. Cryptographic processor 210 extracts the seller ID at step 1320 and looks up the seller's associated public key in cryptographic key database 295 at step 1330, decrypting seller response 130 with this public key at step 1340. As before, if seller response 130 is intelligible then central controller 200 has authenticated the seller at step 1350. Again, unauthorized sellers obtaining seller response 130 before it was received by central controller 200 are not able to undetectably alter it since they do not know the private key of the seller. Unauthorized sellers would, however, be able to read the message if they managed to obtain the public key of the seller. Message secrecy is obtained if the seller encrypts seller response 130 with his public key, requiring the attacker to know the seller's private key to view seller response 130.

Figure 16:
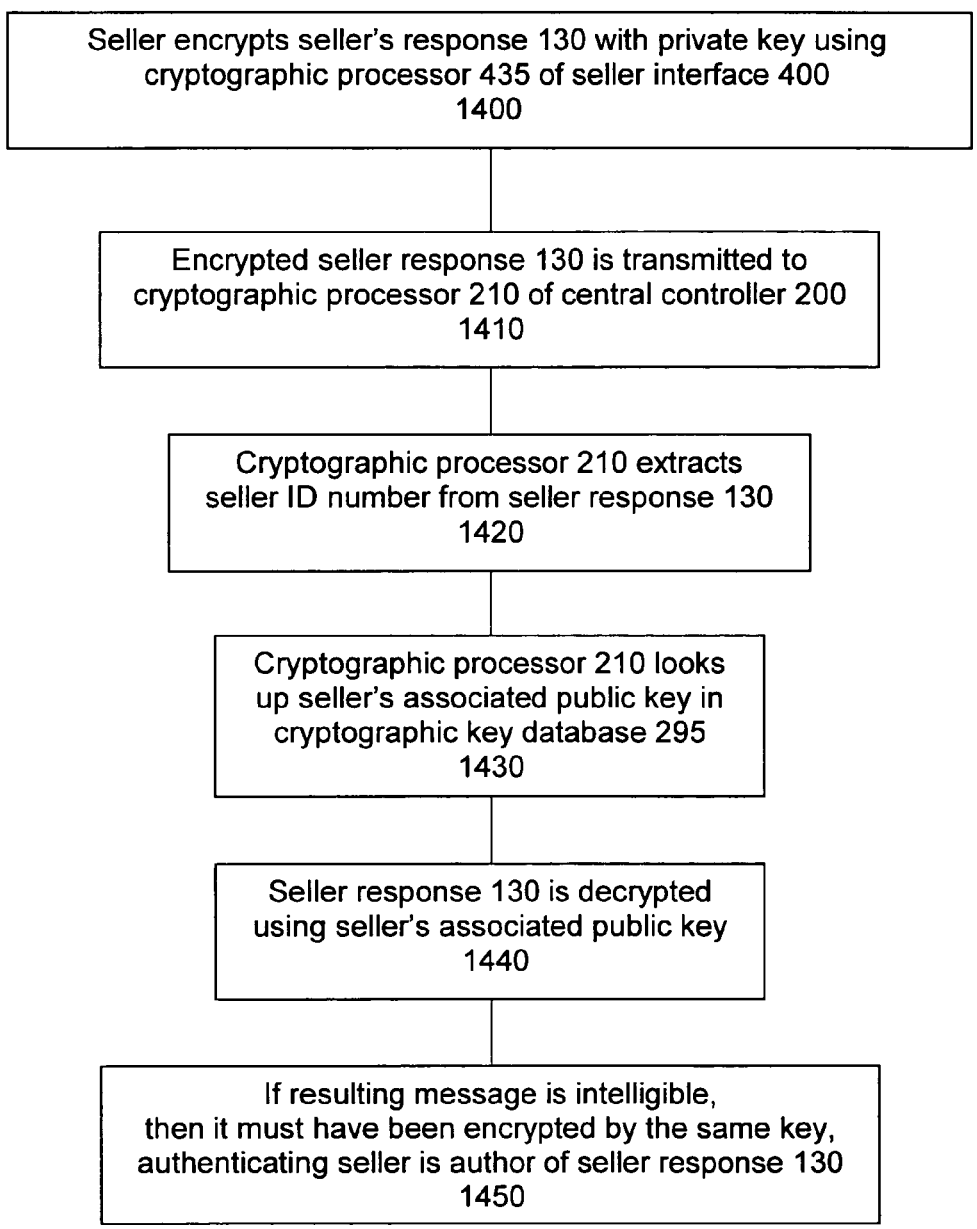

FIG. 16 shows a cryptographic technique using digital signatures to provide authentication and message integrity. As in the asymmetric protocol described above, each seller has an associated public and private key. The seller signs seller response 130 with his private key at step 1400 with cryptographic processor 435 and transmits it to central controller 200 at step 1410. Central controller cryptographic processor 210 extracts the seller ID at step 1420 and looks up the seller's public key at step 1430, verifying the signature using seller response 130 and the public key of the seller at step 1440. If seller response 130 is intelligible, then central controller 200 accepts seller response 130 as authentic at step 1450.

Figure 17:
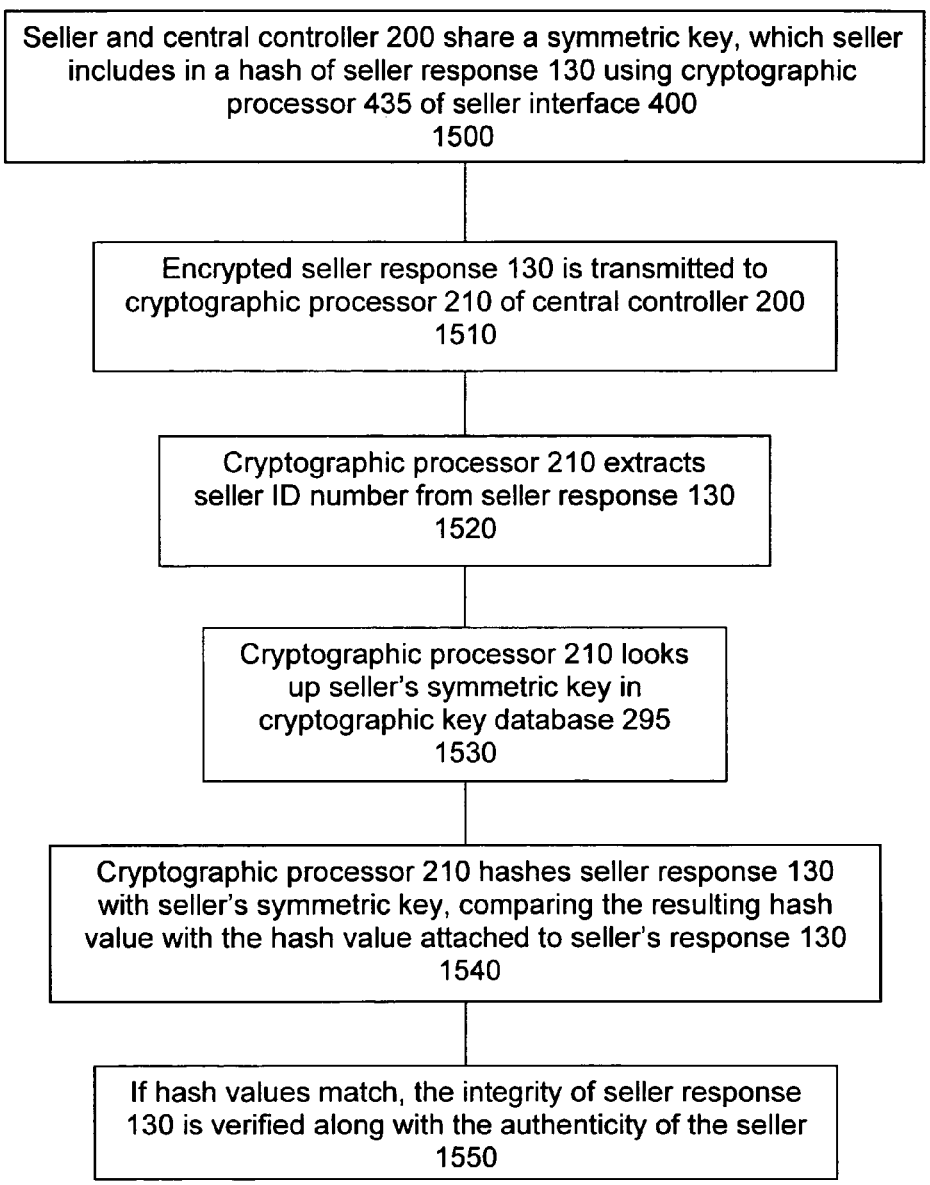

Referring now to FIG. 17, there is described a cryptographic technique using message authentication codes for verifying the authenticity and integrity of seller response 130. In the hash protocol of the present invention, the seller and central controller 200 share a symmetric key, which the seller includes in a hash of seller response 130 at step 1500. In the hash protocol, a one-way function is applied to the digital representation of seller response 130, generating a code that acts like a fingerprint of seller response 130. After transmitting seller response 130 to central controller 200 at step 1510, cryptographic processor 210 extracts seller ID from seller response 130 at step 1520. Then cryptographic processor 210 looks up the seller's symmetric key at step 1530 and hashes seller response 130 with this symmetric key at step 1540, comparing the resulting hash value with the hash value attached to seller response 130. If the values match at step 1550, the integrity of seller response 130 is verified along with the authenticity of the seller.

Although cryptographic techniques can provide greater confidence in the authenticity of seller response 130, they are useless if the seller's cryptographic keys are compromised. An attacker obtaining the symmetric key of another seller is indistinguishable from that seller in the eyes of central controller 200. There is no way to know whether the seller was the true author of seller response 130, or an attacker with the right cryptographic keys. One way to solve this problem (known as undetected substitution) is to use biometric devices such as a fingerprint reader, voice recognition system, retinal scanner and the like. These devices incorporate a physical attribute of the seller into seller response 130, which is then compared with the value stored in seller database 270 at central controller 200. In the present invention, such devices attach to seller interface 400.

Fingerprint verification, for example, may be executed before the creation of seller response 130, during the generation of seller response 130 in response to prompts from central controller 200, at some predetermined or random times, or continuously by incorporating the scanning lens into seller interface 400 such that the seller is required to maintain his finger on the scanning lens at all times for continuous verification while seller response 130 is generated.

In a voice embodiment the seller's voice is used to verify his identity. This embodiment has the advantage of not requiring the use of any specialized hardware since it can be implemented over a standard phone connection. The seller's identity is verified at central controller 200. The process of obtaining a voice-print and subsequently using it to verify a person's identity is well-known in the art, and therefore need not be described in detail herein. Conventional speaker identification software samples the seller's voice. This sample is stored at central controller 200 in seller database 270. Each time the seller wants to transmit seller response 130 to central controller 200, he is required to call central controller 200 and speak into the phone at the prompt for a voice sample. If this sample matches that stored in seller database 270, the seller is provided a password which is incorporated into the digital signature appended to seller response 130. Any seller response 130 received without an appropriate voice match password is not accepted. The voice-print may also be stored in a database within data storage device 460 of seller interface 400, to verify the seller's identity locally prior to allowing seller response 130 to be created.

Although the above cryptographic and biometric protocols describe the authentication and validation of seller response 130, they may be equally applied to the authentication and validation of CEPIO 100, buyer response 110, or any other message or communication between buyers, buyer's agents, sellers, seller's agents, and central controller 200.

Trusted Server Embodiment

Figure 18:
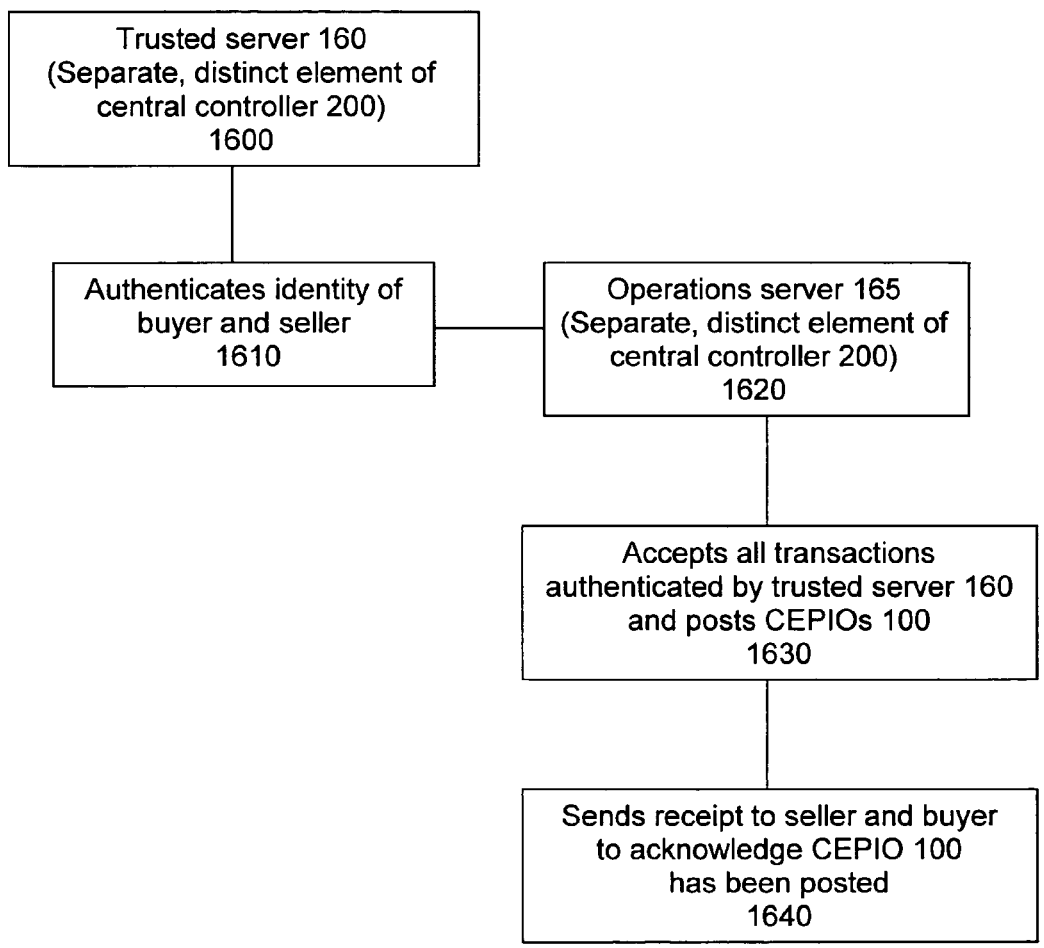
FIG. 18 illustrates an embodiment showing the use of a trusted server.

In one embodiment of the present invention, central controller 200 is separated into two distinct elements: trusted server 160 and operations server 165. Each server performs a distinct task in the process of managing CEPIO 100. The separation makes it more difficult for attackers to compromise the system, as they must defeat the security of two separate systems instead of one. As indicated in FIG. 18, these servers work in conjunction with buyer interface 300 and seller interface 400 in accomplishing their tasks. Trusted server 160, shown at step 1600, authenticates the identity of buyers and sellers at step 1610. The operations server 165, shown in step 1620, accepts all transactions previously authenticated by trusted server 160 and posts CEPIOs 100 in step 1630. At step 1640, operations server 165 sends a receipt to the seller and the buyer acknowledging that a CEPIO 100 has been posted. In this embodiment, each server type may be distributed over a number of servers. It is important to note that the trusted server 160 and operations server 165 can conceivably be the same entity. In this case, the protocols required in the method of the present invention can be simplified.

Although we have described possible methods for buyers and sellers to interact in the above embodiments, there are other equivalents. For example, there are similar embodiments in which a buyer's agent and/or a seller's agent may interact on behalf of the respective buyer and/or seller and submit and bind CEPIOs 100 through use of central controller 200. According to one feature of the present invention, the CEPIO management system 100 provides an optional agency feature that permits the CEPIO management system 100 to accept or reject a given CEPIO on behalf of certain agency-based sellers 140 and/or agency-based buyers 120 who have delegated authority to the CPO management system 100. According to another feature of the present invention, the CEPIO management system 100 provides an optional feature that permits the CEPIO management system 100 to broadcast CEPIOs 100 to sellers or buyers for evaluation.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

What is claimed is:

1. A method for using a computer to facilitate a transaction for purchasing a good or service between at least one of a plurality of relevant buyers and a least one of a plurality of relevant sellers, comprising:
    the buyer inputting into the computer a conditional early payment incentive offer ("CEPIO") which is initiated by said buyer, said CEPIO including an amount to be paid and a time for said amount to be paid, said CEPIO offering to pay said seller a lesser amount than is typically charged by the seller and said time for said amount within said CEPIO being earlier than in a typical transaction;
    presenting said CEPIO over a computer to a plurality of relevant sellers;
    said seller within said plurality of sellers accepting said CEPIO and communicating acceptance to said buyer;
    said seller providing said good or service; and
    providing payment over a computer to said seller by said time designated in said CEPIO.

2. A method as claimed in claim 1, further comprising:
    inputting into said computer a seller identification number and seller general purpose account number, each general purpose account number being associated with said CEPIO, and with the acceptance of said CEPIO; and
    providing said payment over said computer to said seller using said seller identification number and said seller general purpose account numbers.

3. A method as claimed in claim 2, further comprising:
    setting an active period during which the CEPIO is active;
    determining whether an acceptance of said CEPIO occurred during said active period; and
    inputting into said computer whether an acceptance of said CEPIO occurred within said active period.

4. A method as claimed in claim 1, further comprising:
    establishing necessary minimum information necessary to process said CEPIO;
    said seller providing information to process said CEPIO;
    determining whether said necessary minimum information is present; and
    requesting additional information necessary to process said CEPIO when said seller has failed to provide said necessary minimum information.

5. A method as claimed in claim 1 wherein at least one of the sellers has not previously provided services to said buyer.

* * * * *